(12) United States Patent
Park et al.

(10) Patent No.: US 11,287,295 B2
(45) Date of Patent: Mar. 29, 2022

(54) FLOW RATE MEASUREMENT DEVICE AND FLOW RATE MEASUREMENT METHOD THEREBY

(71) Applicants: Joon Young Park, Seoul (KR); Hae Soo Yu, Ulsan (KR)

(72) Inventors: Joon Young Park, Seoul (KR); Jo Anne Park, Seoul (KR)

(73) Assignees: Joon Young Park; Hae Soo Yu

( * ) Notice: Subject to any disclaimer, the term of this patent is extended or adjusted under 35 U.S.C. 154(b) by 0 days.

(21) Appl. No.: 16/903,733

(22) Filed: Jun. 17, 2020

(65) Prior Publication Data

US 2020/0309575 A1   Oct. 1, 2020

Related U.S. Application Data

(63) Continuation of application No. PCT/KR2018/016160, filed on Dec. 18, 2018.

(30) Foreign Application Priority Data

Dec. 18, 2017 (KR) .......................... 10-2017-0174603

(51) Int. Cl.
*G01F 1/06* (2006.01)
*G01F 1/08* (2006.01)

(52) U.S. Cl.
CPC ................ *G01F 1/065* (2013.01); *G01F 1/08* (2013.01)

(58) Field of Classification Search
CPC .................................. G01F 1/065; G01F 1/103
See application file for complete search history.

(56) References Cited

U.S. PATENT DOCUMENTS

| 3,792,610 A | * | 2/1974 | Kountanis | ............... G01F 1/065 73/861.77 |
| 4,195,522 A | * | 4/1980 | Anderson | ................. G01F 1/06 73/861.79 |
| 4,441,505 A | * | 4/1984 | Edwards | ................. G01F 1/065 600/539 |

FOREIGN PATENT DOCUMENTS

JP           60076612 A   *   5/1985   ............... G01D 5/36

* cited by examiner

*Primary Examiner* — Erika J Villaluna
(74) *Attorney, Agent, or Firm* — Park & Associates IP Law, P.C.

(57) ABSTRACT

The present invention relates to a flow rate measurement device and, more specifically, to a flow rate measurement device and a flow rate measurement method, wherein a flow rate is measured by sensing a rotation caused by a flow of a fluid. The present invention provides a flow rate measurement device characterized by comprising: a housing (100) having a fluid inlet port (111) and a discharge port (112) formed to face each other; a rotating portion (200) comprising a rotating shaft (210) arranged perpendicularly to a virtual line (C) connecting the inlet port (111) and the discharge port (112) inside the housing (100), and a blade (220) rotated by a flow of a fluid around the rotating shaft (210); a sensor portion arranged to be spaced apart from the rotating shaft (210) in the radial direction of the rotating shaft (210) so as to sense the number of rotations of the rotating portion (200); and a control portion (330) for measuring the flow rate of the fluid on the basis of the number of rotations of the rotating portion (200) sensed by the sensor portion.

20 Claims, 30 Drawing Sheets

FLUID FLOW DIRECTION

FLOW RATE MEASUREMENT DEVICE AND FLOW RATE MEASUREMENT METHOD THEREBY

REFERENCE TO RELATED APPLICATIONS

This is a continuation of International Patent Application PCT/KR2018/016160 filed on Dec. 18, 2018, which designates the United States and claims priority of Korean Patent Application No. 10-2017-0174603 filed on Dec. 18, 2017, the entire contents of which are incorporated herein by reference.

FIELD OF THE INVENTION

The present invention relates to a flow rate measurement device, and more particularly, to a flow rate measurement device and a flow rate measurement method for measuring a flow rate by sensing a rotation caused by a flow of a fluid.

BACKGROUND OF THE INVENTION

In general, a water meter is a device for measuring an amount of water supplied from a water supply source to users such as households or offices. Since the amount of water used at the place of use is calculated as water charges and billed to the user, it is necessary to accurately measure the amount of water used, and for this, a precise flow rate measurement device is required.

In the related art, a permanent magnet and a reed switch have been used as a device for measuring the amount of water used, but since the reed switch is operated by a magnetic force, the presence of an object having another magnetic force near the reed switch can result in a problem of inefficient on/off action of the reed switch.

In order to solve such a problem, PTLs 1 and 2 listed below disclose a device that checks the number of rotations to measure a flow rate by a sensor and a configuration of selectively blocking signals from the sensor.

Meanwhile, PTLs 1 and 2 disclose, with respect to a rotating portion that includes a rotating shaft and an impeller, a configuration in which a sensor portion for sensing a rotation of the rotating portion is formed on one side of the impeller in a longitudinal direction of the rotating shaft.

However, according to PTLs 1 and 2, the rotating portion and the sensor portion are sequentially arranged in the direction of the rotating shaft such that, as a fluid presses the rotating shaft in a direction perpendicular to the rotating shaft, an imbalance in the supporting force at one end and the other end occurs in the longitudinal direction of the rotating shaft.

In addition, wear of the rotating shaft, vibration of the rotating portion including the rotating shaft, and the like occur due to the imbalance of the supporting force for the rotating shaft, which results in problems such as shortened life, and inefficient sensing of the flow rate due to partial damages to the rotating portion.

(PTL 1) KR10-1112224 B1
(PTL 2) KR10-1729261 B1

SUMMARY OF THE INVENTION

In order to solve the problems mentioned above, an object of the present invention is to provide a flow rate measurement device capable of greatly improving the durability which will lead into significantly increased the replacement cycle, and accurately measuring a flow rate, and a flow rate measurement method using the same.

The present invention was designed in order to achieve the object of the present invention as described above, the present invention provides a flow rate measurement device including: a housing 100 including an inlet port 111 and a discharge port 112 for a fluid, which are formed to face each other; a rotating portion 200 including a rotating shaft 210 arranged perpendicularly to a virtual line C connecting the inlet port 111 and the discharge port 112 inside the housing 100, and a blade 220 rotated by a flow of the fluid around the rotating shaft 210; a sensor portion arranged to be spaced apart from the rotating shaft 210 in a radial direction of the rotating shaft 210 so as to sense a number of rotations of the rotating portion 200; and a control portion 330 that measures a flow rate of the fluid on the basis of the number of rotations of the rotating portion 200 sensed by the sensor portion.

The sensor portion may include: a first sensing portion 310 installed to be spaced apart from the rotating shaft 210 in the radial direction of the rotating shaft 210; and an interaction portion 320 coupled radially to the blade 220 such that the rotation of the rotating portion 200 is recognized by an interaction with the first sensing portion 310.

The first sensing portion 310 may include a first light emitting portion 311 that generates light in an axial direction of the rotating shaft 210, and a first light receiving portion 312 that is spaced apart from the first light emitting portion 311 in the axial direction of the rotating shaft 210 to receive the light emitted from the first light emitting portion 311.

The sensor portion may further include a second sensing portion 350 arranged around the rotating shaft 210 to have a predetermined angle difference with the first sensing portion 310, and including a second light emitting portion 351 that generates light in the axial direction of the rotating shaft 210 and a second light receiving portion 352 arranged to be spaced apart from the second light emitting portion 351 in the axial direction of the rotating shaft 210 to receive the light emitted from the second light emitting portion 351, in which the control portion 330 may determine a direction of rotation of the rotating portion 200 according to whether the light to the first light receiving portion 312 and the second light receiving portion 352 is blocked.

The interaction portion 320 may include one or more blocking portions 321 arranged at an angle difference of 180°/N (N is a natural number of 1 or more) to be able to alternately block and unblock an optical path between the first light emitting portion 311 and the first light receiving portion 312 by the rotation of the rotating shaft 210.

The blocking portion 321 may be an arc-shaped plate having an angle of 180°/N (N is a natural number of 1 or more) around the rotating shaft 210.

The blocking portion 321 may be divided into a plurality of areas around the rotating shaft 210.

The blocking portion 321 may be integrally formed by being connected along a circumferential direction around the rotating shaft 210.

The blade 220 may have a rectangular shape arranged in a longitudinal direction of the rotating shaft 210 and be coupled, at one end, to the rotating shaft 210, and the blocking portion 321 may be formed with the blade 220 by integral injection.

For the blocking portion 321, a circular plate, which is formed by double injection using a transparent material and an opaque material, and coupled to the blade 220, may be used.

The blocking portion 321 may be arranged at a center of the blade 220 in a longitudinal direction of the rotating shaft 210.

The blocking portion 321 may be formed as an arc-shaped plate having an angle of 180° around the rotating shaft 210, and may further include a semicircular connecting portion 322 connecting both ends of the blocking portion 321 to each other along a circumferential direction around the rotating shaft 210.

For example, the blade 220 may be formed on the rotating shaft 210 by double injection or insert injection, and the blocking portion 321 may be formed with the blade 220 by integral injection.

In addition, the blocking portion 321 may be provided at a corresponding position and formed of a material that is not light-transmissive such as a dark-colored material, so as to be able to block and unblock an optical path by the interaction with the sensing portion (310, 350) described above, when the interaction portion 320 is arranged at the center of the blade 220 in the longitudinal direction of the rotating shaft 210.

As an example, the blocking portion 321 may be formed by forming all of the arc plate portions of the interaction portion 320 coupled to the blade 220 in the radial direction with a dark plastic by integral injection.

The housing 100 may include: a lower housing 110 including the inlet port 111 and the discharge port 112 which are formed to face each other, and an opening on an upper side; and an upper housing 150 coupled with the lower housing 110 to cover the opening of the lower housing 110, and exposing a display portion 340 of the control portion 330 to outside.

The housing 100 may include: a sub-housing 130 installed within the lower housing 110 and supporting the rotating portion 200, and including a guide flow path formed to guide the fluid introduced through the inlet port 111 toward the discharge port 112, and an opening on an upper side; and a cover member 140 that covers the opening of the sub-housing 130 and includes a first transparent guide groove 141 protruding upward to guide the rotation of the interaction portion 320, in which the first light emitting portion 311 and the first light receiving portion 312 may be installed to face each other with respect to the first transparent guide groove 141.

In addition, when the second sensing portion 350 is provided, the second light emitting portion 351 and the first light receiving portion 352 may also be installed to face each other with respect to the first transparent guide groove 141.

The sub-housing 130 may include a pair of rotating shaft guide grooves 136 formed on an inner circumferential surface such that the rotating shaft 210 can be inserted from an upper side, and a protruding guide portion 137 formed on an outer circumferential surface, in which the protruding guide portion 137 may correspond to the rotating shaft guide grooves 136 and be inserted along the second guide groove 117 formed on the inner circumferential surface of the lower housing 110 such that the rotating shaft 210 may be arranged perpendicularly to the virtual line C connecting the inlet port 111 and the discharge port 112.

The sub-housing 130 may include an inflow port 131 and an outflow port 132 which are formed to face each other around the rotating shaft 210 so as to form a guide flow path for guiding the fluid introduced through the inlet port 111 toward the discharge port 112.

The sub-housing 130 and the cover member 140 may form a cylindrical inner space corresponding to the rotation of the blade 220, and include rotation guide portions 139 and 149 extending to protrude from an inner circumferential surface of the cylindrical inner space in the radial direction of the rotating shaft 210 to allow a rotation of the blocking portion 321 extending in the radial direction of the rotating shaft 210.

The interaction portion 320 may include one or more blocking portions 321 arranged at an angle difference of 180°/P (P is an odd number of 1 or more) to be able to alternately block and unblock an optical path between the first light emitting portion 311 and the first light receiving portion 312 and between the second light emitting portion 351 and the second light receiving portion 352 by the rotation of the rotating shaft 210.

The rotation guide portion 139 may protrude from the inner circumferential surface of the inner space of the sub-housing 130 respectively and extend vertically and continuously across a center of each side on which the inflow port 131 and the outflow port 132 of the sub-housing 130 are formed.

The inflow port 131 and the outflow port 132 may be a plurality of openings formed in symmetry with respect to the rotation guide portion 139, respectively.

The inflow port 131 and the outflow port 132 may be formed in a radial shape on a side perpendicular to the rotating shaft 210 of the sub-housing 130 to guide the fluid such that the blade 220 is rotated from the inflow port 131 side toward the outflow port 132 side at a lower side of the rotating shaft 210.

The cover member 140 may include a plurality of coupling members 147 installed on an upper surface, in which the plurality of coupling members 147 may include bolt holes 148 formed therein, through which a plurality of screws 335, penetrating a plurality of through holes 337 formed in the control portion 330, are inserted and bolted so as to be coupled at a predetermined distance apart from the control portion 330.

The present invention also relates to a flow rate measurement method using the flow rate measurement device as described above, which may include: a light emitting step (S1), at the first light emitting portion 311, of emitting light toward the first light receiving portion 312; a storage step (S2), at the control portion 330, of determining whether the first light receiving portion 312 receives the light and storing a result value accordingly; and an off step (S3) of turning off the light emission of the first light emitting portion 311, in which the flow rate may be measured by repeating the light emitting step (S1), the storage step (S2) and the off step (S3) at a set period (t) interval, and counting the number of rotations of the rotating portion 200 on the basis of a number of times the result value according to whether the light is received in the storage step (S2) is changed.

With the flow rate measurement method, the flow rate may be measured based on a rotational speed of the rotating portion 200, by calculating a hold time during which the result value according to whether the first light receiving portion 312 receives light is maintained the same, comparing the calculated result with a hold time during which a previous result value is maintained the same, and increasing or decreasing the set period (t) according to increase or decrease in the hold time.

The present invention also relates to a flow rate measurement method using the flow rate measurement device having the configuration as described above, which may include: a light emitting step (S1), at the first light emitting portion 311, of emitting light toward the first light receiving portion 312; a storage step (S2), at the control portion 330, of determining whether the first light receiving portion 312 receives the light and storing a result value accordingly; and an off step (S3) of turning off the light emission of the first light emitting portion 311, in which the flow rate is measured by repeating the light emitting step (S1), the storage step (S2) and the off step (S3) at a set period (t) interval, and counting the number of rotations of the rotating portion 200 on the basis of a number of times the result value according to whether the light is received in the storage step (S2) is changed, and when only the first sensing portion 310 is used, the set period (t) is set to be shorter than a shorter time duration between a time duration during which the blocking portion 321 passes the first sensing portion 310 and a time duration during which the remaining portion other than the blocking portion 321 passes the first sensing portion 310, and when both the first sensing portion 31 and the second sensing portion 350 are used, the set period (t) is set to be shorter than ½ of the shorter time duration between the time duration during which the blocking portion 321 passes the first sensing portion 310 and the time duration during which the remaining portion other than the blocking portion 321 passes the first sensing portion 310.

The present invention also relates to a flow rate measurement device including: a housing 100 including an inlet port 111 and a discharge port 112 for a fluid, which are formed to face each other; a rotating portion 200 including a rotating shaft 210 arranged inside the housing 100 and a blade 220 rotated by a flow of the fluid around the rotating shaft 210; a sensor portion 300 arranged to be spaced apart from the rotating shaft 210 in a radial direction of the rotating shaft 210 so as to sense a number of rotations of the rotating portion 200, and including a first light emitting portion 311 that generates light in an axial direction of the rotating shaft 210, and a first light receiving portion 312 that is spaced apart from the first light emitting portion 311 in the axial direction of the rotating shaft 210 to receive the light emitted from the first light emitting portion 311; and a control portion 330 coupled to the housing 100 to measure a flow rate of the fluid on the basis of the number of rotations of the rotating portion 200 sensed by the sensor portion, in which the method may include: a light emitting step (S1), at the first light emitting portion 311, of emitting light toward the first light receiving portion 312; a storage step (S2), at the control portion 330, of determining whether the first light receiving portion 312 receives the light and storing a result value accordingly; and an off step (S3) of turning off the light emission of the first light emitting portion 311, in which the flow rate may be measured by repeating the light emitting step (S1), the storage step (S2) and the off step (S3) at a set period (t) interval, and counting the number of rotations of the rotating portion 200 on the basis of a number of times the result value according to whether the light is received in the storage step (S2) is changed.

The flow rate measurement device and the flow rate measurement method using the same according to the present invention has advantages of greatly improved durability, significantly increased replacement cycle, and accurate measuring of the flow rate, by arranging a position of a sensor for flow rate measurement in the radial direction with respect to a rotating shaft.

The flow rate measurement device and the flow rate measurement method using the same according to the present invention has advantages of greatly improved durability, significantly increased replacement cycle, and accurate measuring of the flow rate, by arranging a position of a sensor for flow rate measurement in the radial direction with respect to a rotating, and also enables long use with a structure that prevents shaking of the rotational shaft due to fluid and minimizes irregular wear.

The flow rate measurement device and the flow rate measurement method using the same according to the present invention can accurately check the flow rate by a relatively simple method, and in addition to the flow rate check, and in contrast to the flow rate measurement that uses a sensor having a fixed cycle, which has disadvantageous such as difficulty of accurate flow rate measurement and excessive electrical cost due to a consistent sensor cycle, there is an economical advantage that it is possible to precisely measure the flow rate by changing the light emission period of the sensor in response to the rotation cycle according to the flow rate, and also prevent power consumption by increasing the waiting time of the control portion when the rotational speed is low due to low flow rate.

DETAILED DESCRIPTION OF THE INVENTION

Figure 1:
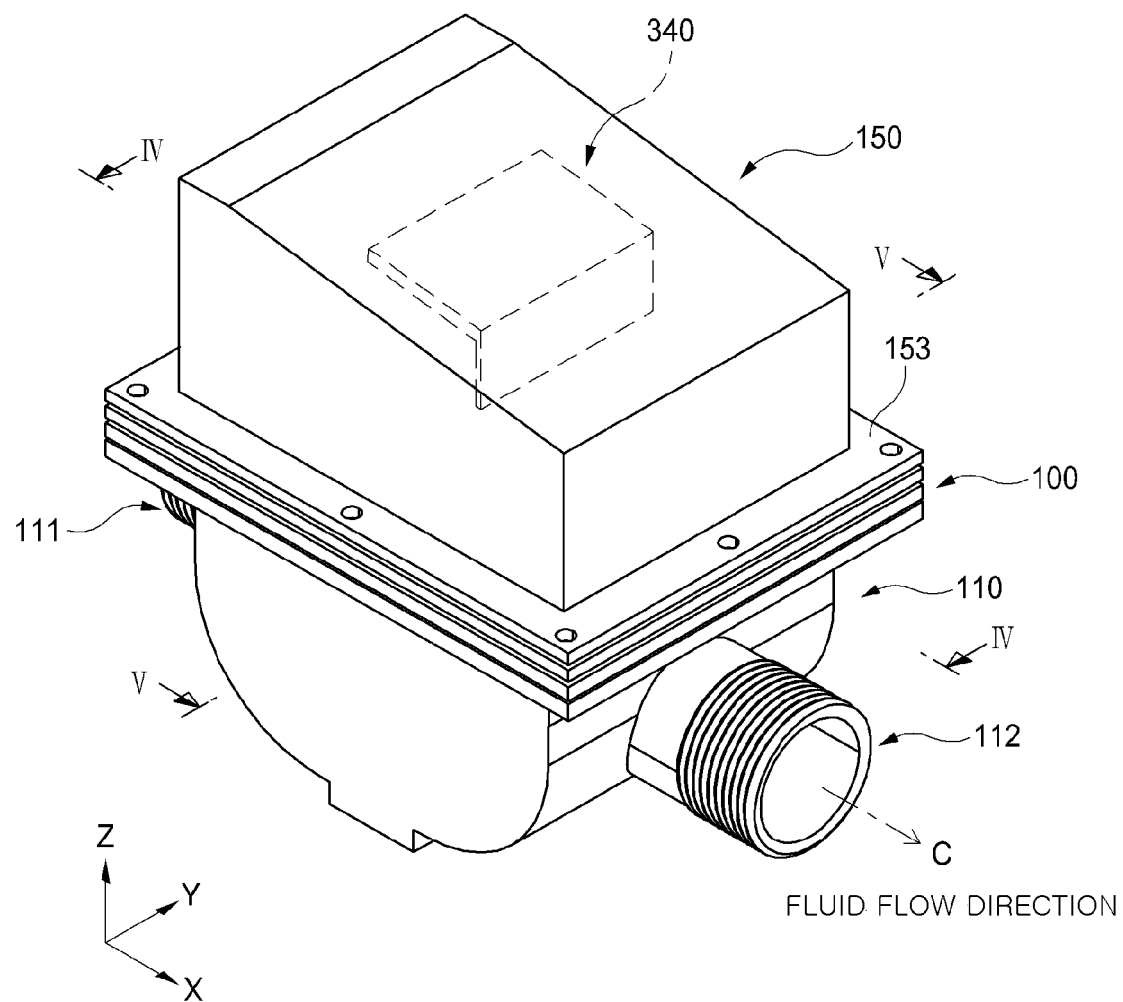
FIG. 1 is a perspective view showing a flow rate measurement device according to the present invention.

Hereinafter, a flow rate measurement device according to the present invention will be described in detail with reference to the accompanying drawings.

As shown in FIGS. 1 to 11B, the flow rate measurement device according to the present invention includes: a housing 100 including an inlet port 111 and a discharge port 112 for a fluid, which are formed to face each other; a rotating portion 200 including a rotating shaft 210 arranged perpendicularly to a virtual line C connecting the inlet port 111 and the discharge port 112 inside the housing 100, and a blade 220 rotated by a flow of the fluid around the rotating shaft 210; a sensor portion arranged to be spaced apart from the rotating shaft 210 in a radial direction of the rotating shaft 210 so as to sense a number of rotations of the rotating portion 200; and a control portion 330 that measures a flow rate of the fluid on the basis of the number of rotations of the rotating portion 200 sensed by the sensor portion.

The flow rate measurement device as used herein refers to a device that is connected to a pipe or the like through which a fluid can flow to measure a flow rate of the fluid, and can be used in various fields in a configuration for measuring a flow rate of the fluid flowing through a pipe, such as, specifically, installed in a water pipe or the like and used to measure an amount of water consumed by a user.

The housing 100 is configured such that the inlet port 111 and the discharge port 112 for the fluid are formed to face each other in an X-axis direction, for example, and various configurations may be applicable that allow the fluid to be introduced from the outside and be discharged back to the outside.

The housing 100 may be connected to a pipe of a supply source such that the fluid supplied from the outside is introduced through the inlet port 111, and the discharge port 112 may be connected to a pipe at a place of use such that the fluid discharged from the discharge port 112 is supplied to the place of use.

For example, the housing 100 may be installed at a portion of the water pipe, with the inlet port 111 being connected with a pipe connected to the supply source, and the discharge port 112 being connected with a pipe connected to the place of use.

Since the housing 100 is in such a configuration that passes fluid such as water, the housing 100 is formed of a material that does not easily corrode, and more specifically, may be formed using a material such as copper, engineering plastic, stainless steel, or the like.

For example, the housing 100 may include a lower housing 110 including the inlet port 111 and the discharge port 112 which are formed to face each other, and an opening on an upper side; and an upper housing 150 coupled with the lower housing 110 to cover the opening of the lower housing 110, and exposing a display portion 340 of the control portion 330 to outside.

The lower housing 110 may include the inlet port 111 and the discharge port 112 which are formed to face each other, and an opening on an upper side, and various configurations may be applicable.

For example, the lower housing 110 may be configured such that it 110 is detachably coupled with the upper housing 150, which will be described below, to form an inner space in which the rotating portion 200 or the like can be installed, and may be formed of a material such as copper, engineering plastic, stainless steel, and the like.

The inlet port 111 may be configured such that it 111 is coupled with a pipe connected to the supply source, and various configurations may be applicable, and specifically, threads may be formed on the outer circumferential surface.

The discharge port 112 may be configured such that it 112 is coupled with a pipe connected to the place of use, and various configurations may be applicable, and specifically, threads may be formed on the outer circumferential surface.

The upper housing 150 may be configured such that it 150 is detachably coupled with the lower housing 110 to cover the opening of the lower housing 110, and exposes the display portion 340 of the control portion 330 to the outside, and various configurations may be applicable.

In this example, the upper housing 150 may be configured in various ways, and for example, the entire upper housing 150 may be formed of a transparent material so that the display portion 340 of the control portion 330 is exposed to the outside, or only a portion corresponding to the display portion 340 requiring the external exposure may be coupled with the transparent member or opened to the outside.

In addition, the upper housing 150 may include a bolt hole formed at an edge corresponding to a bolt hole formed on the lower housing 110 so as to be coupled with the lower housing 110, and may be coupled by bolt coupling.

At this time, a flange portion 143 of the cover member 140 may be interposed between the upper housing 150 and the lower housing 110, in which a bolt hole may be formed in the flange portion so that a bolt for coupling the upper housing 150 and the lower housing 110 is penetrated therethrough and installed.

Meanwhile, a coupling flange portion 620 having an opening 621, through which the cover member 140 is protruded upward, may be installed between the upper housing 150 and the cover member 140 for the stable coupling of the upper housing 150 and the lower housing 110.

The coupling flange portion 620 may be configured such that it 620 is installed between the upper housing 150 and the cover member 140, and includes an opening 621 through which the cover member 140 protrudes upward for the stable coupling of the upper housing 150 and the lower housing 110, and various configurations may be applicable.

Meanwhile, the upper housing 150 and the lower housing 110 may include flange portions 113 and 143 extending from the edges for mutual coupling by bolts or the like.

In addition, between the upper housing 150 and the coupling flange portion 620, and between the coupling flange portion 620 and the cover member 140, sealing members 612 and 613 may be installed between at least one of the lower housing 110 and the sub-housing 130 in order to prevent fluid leakage or the like.

For example, the sealing members 612 and 613 are the members installed between the upper housing 150 and the coupling flange portion 620 and between the coupling flange portion 620 and the cover member 140 to prevent leakage of fluid, and may be a silicone O-ring or the like.

Meanwhile, the housing 100 may include: a sub-housing 130 installed within the lower housing 110 and supporting the rotating portion 200, and including a guide flow path formed to guide the fluid introduced through the inlet port 111 toward the discharge port 112, and an opening on an upper side; and a cover member 140 that covers the opening of the sub-housing 130 and includes a first transparent guide groove 141 protruding upward to guide the rotation of the interaction portion 320.

Figure 6A:
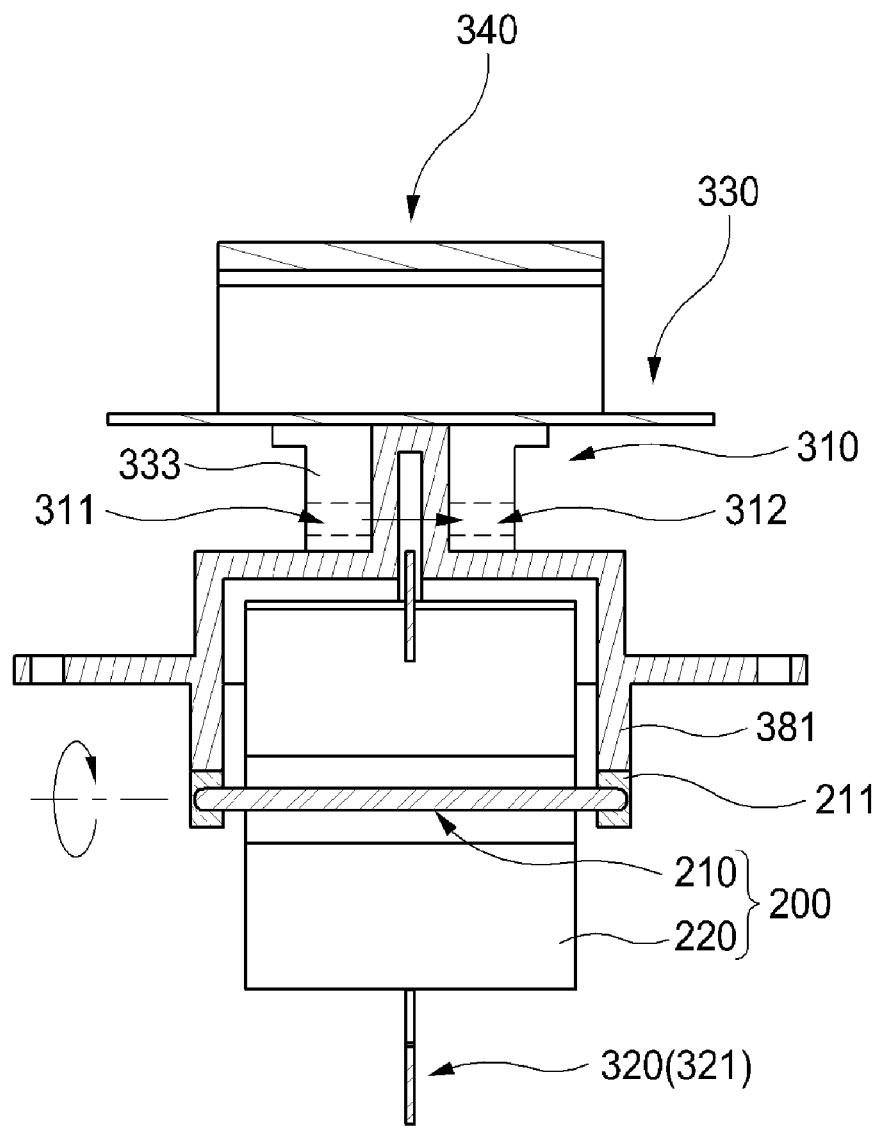
FIGS. 6A and 6B are vertical cross-sectional views showing a process of operating the rotating portion and the sensor portion of FIG. 5.
Figure 6B:
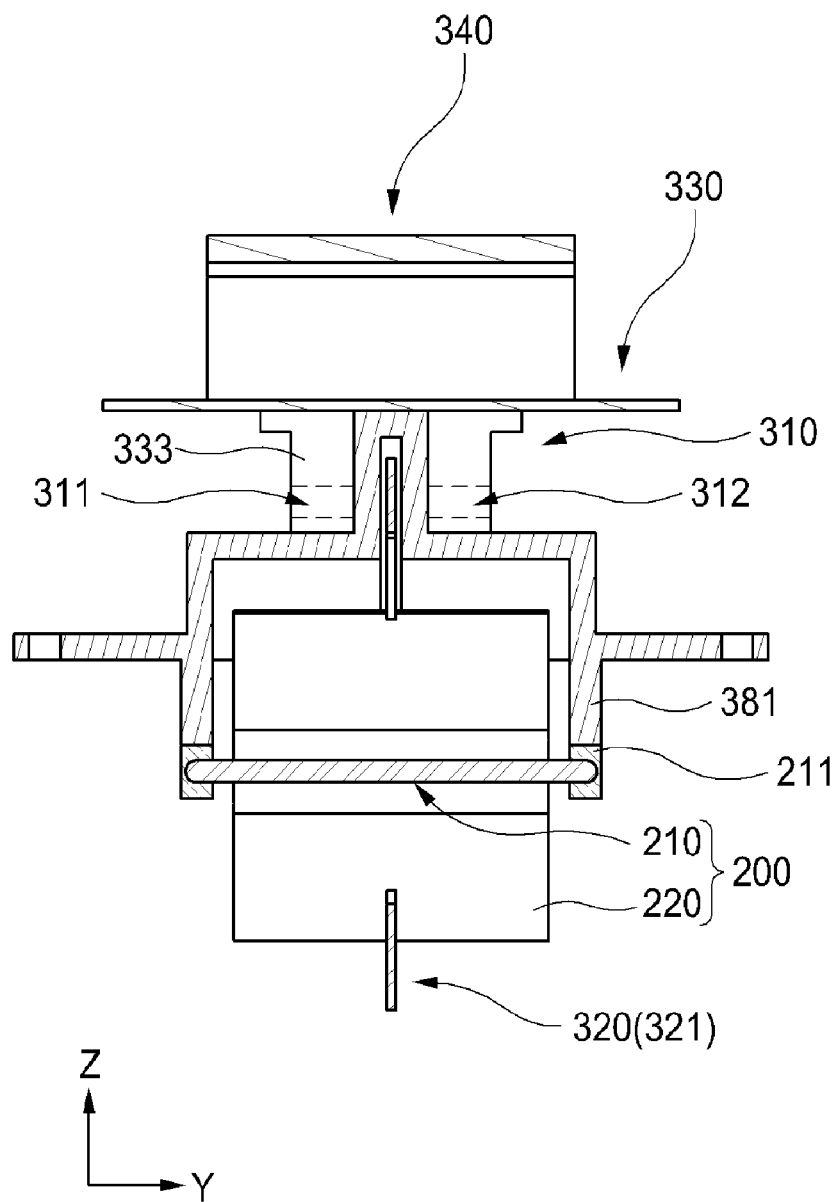
Figure 7A:
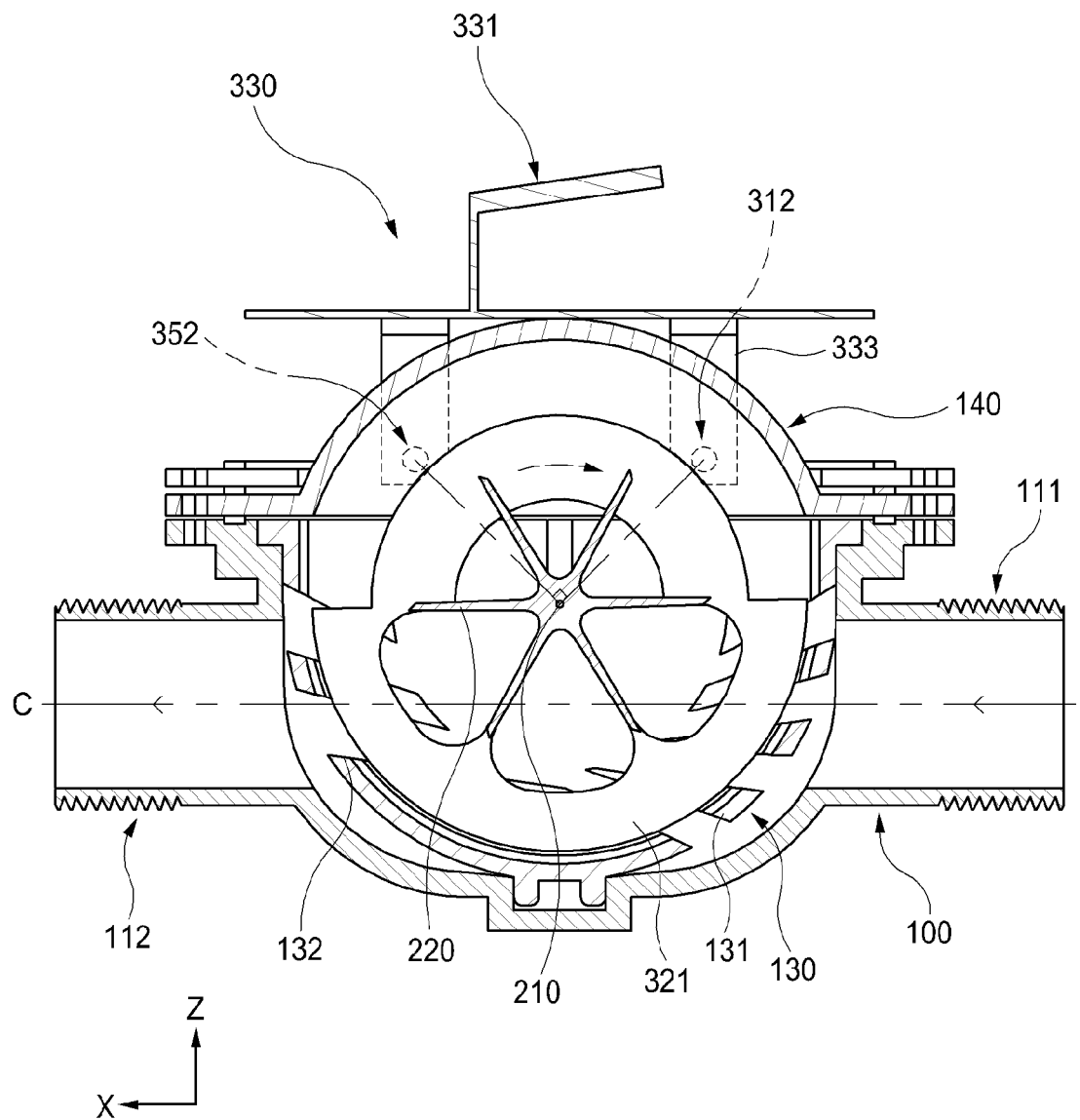
FIGS. 7A and 7B are vertical cross-sectional views showing a process of positioning and operating the rotating portion and the sensor portion of FIG. 4.
Figure 7B:
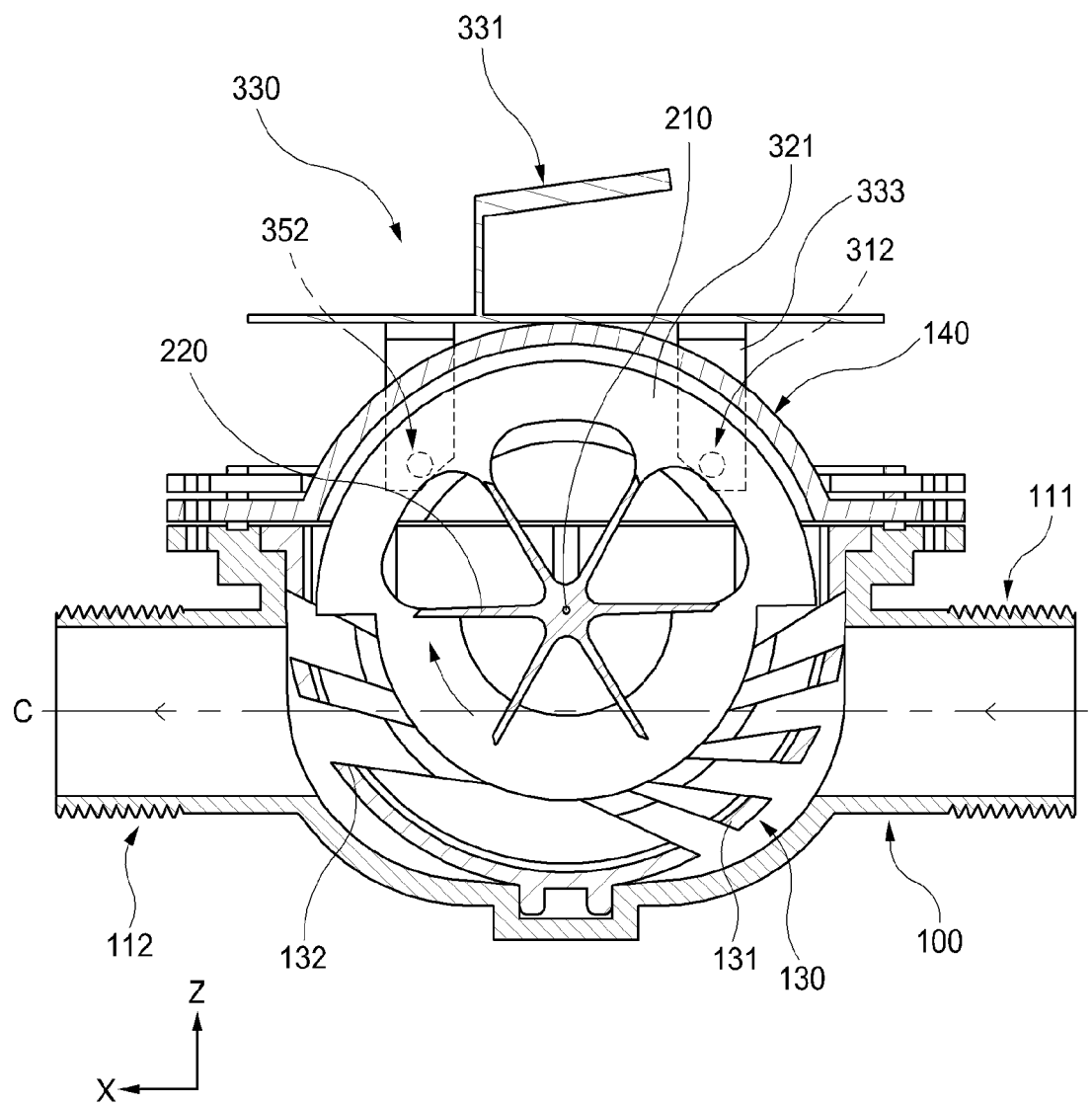
Figure 8:
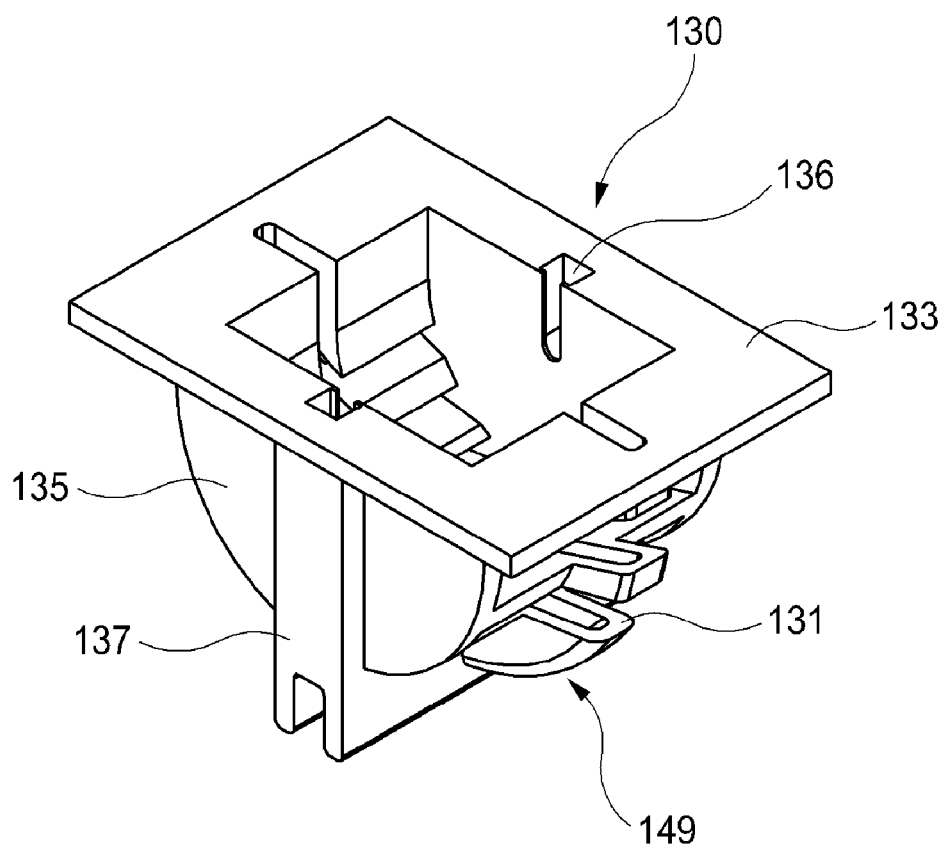
FIG. 8 is a perspective view of a sub-housing of the flow rate measurement device of FIG. 1.
Figure 9:
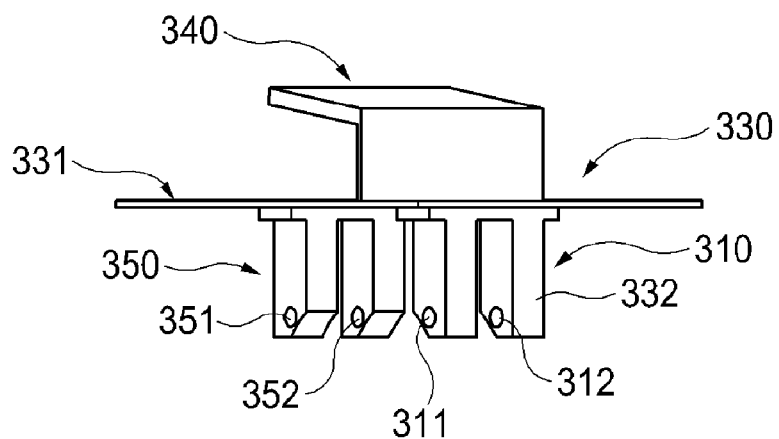
FIG. 9 is an exploded perspective view showing a cover member and a control portion of the flow rate measurement device of FIG. 1.
Figure 9:
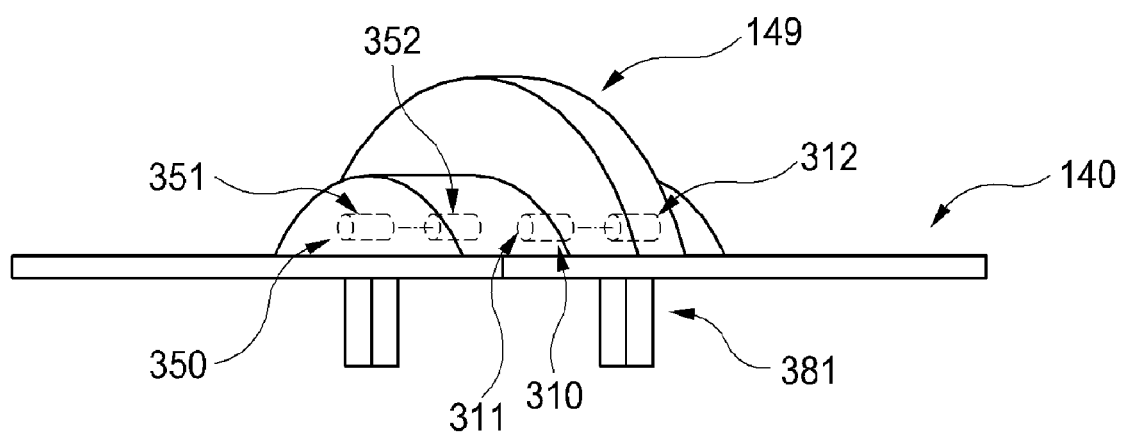

In this example, the first light emitting portion 311 and the first light receiving portion 312, which will be described below, are preferably installed to face each other with respect to the first transparent guide groove 141, as shown in FIGS. 6A and 6B.

Meanwhile, the sub-housing 130 may be configured such that it 130 is installed within the lower housing 110 and supports the rotating portion 200, and includes a guide flow path formed so as to guide the fluid introduced through the inlet port 111 toward the discharge port 112, and an opening on an upper side, and various configurations may be applicable.

Figure 4:
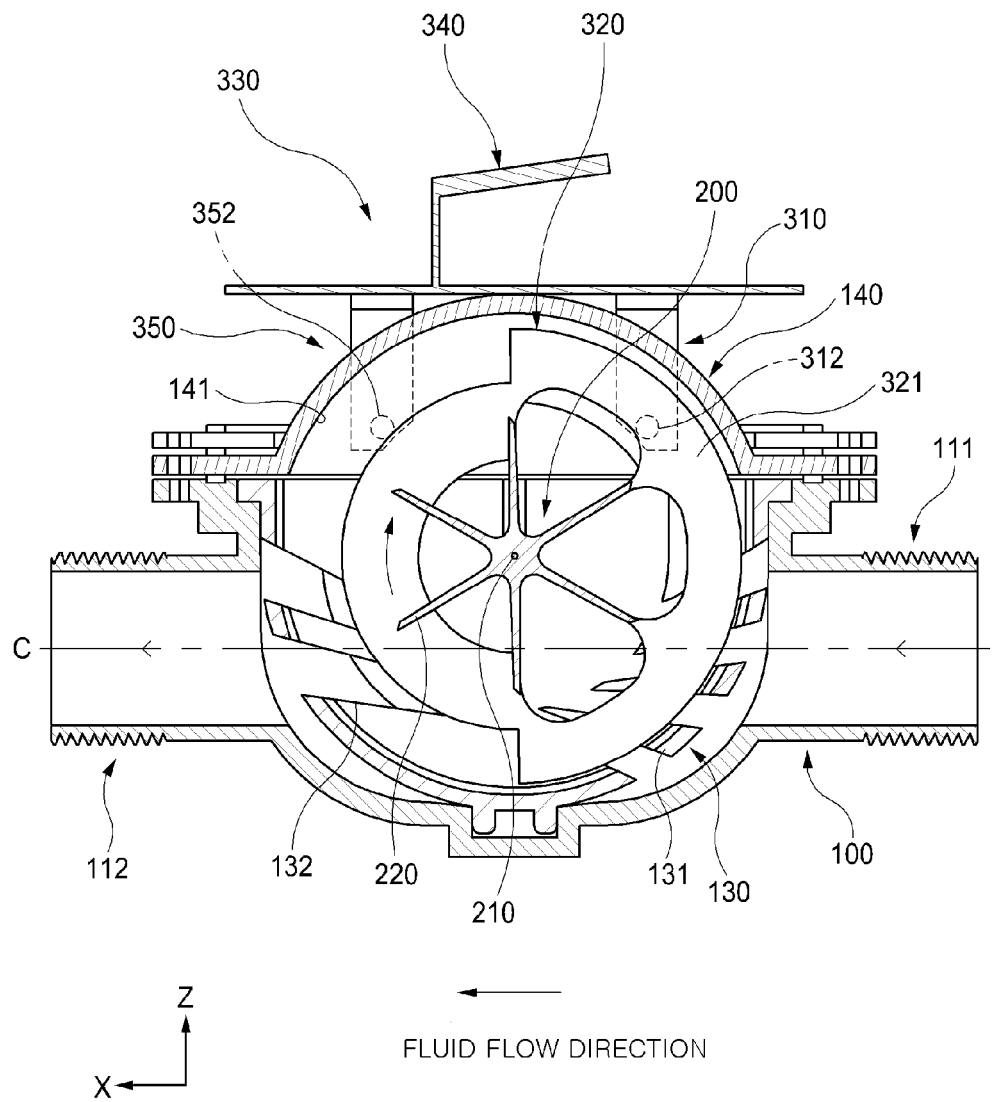
FIG. 4 is a cross-sectional view taken along the line IV-IV in FIG. 1.

In this example, as shown in FIG. 4, the sub-housing 130 and the cover member 140 preferably form a cylindrical inner space corresponding to the rotation of the blade 220.

To this end, the sub-housing 130 and the cover member 140 includes cylindrical portions 135 and 145.

The sub-housing 130 is preferably formed to have an external shape corresponding to the inner circumferential shape of the lower housing 110 in consideration of the fact that it 130 is to be installed within the lower housing 110 described above.

In addition, the sub-housing 130 may include an inflow port 131 and an outflow port 132 which are formed to face each other around the rotating shaft 210 so as to form a guide flow path for guiding the fluid introduced through the inlet port 111 toward the discharge port 112.

The inflow port 131 may be formed as one or more openings to allow the fluid introduced through the inlet port 111 to flow into the sub-housing 130.

Figure 2:
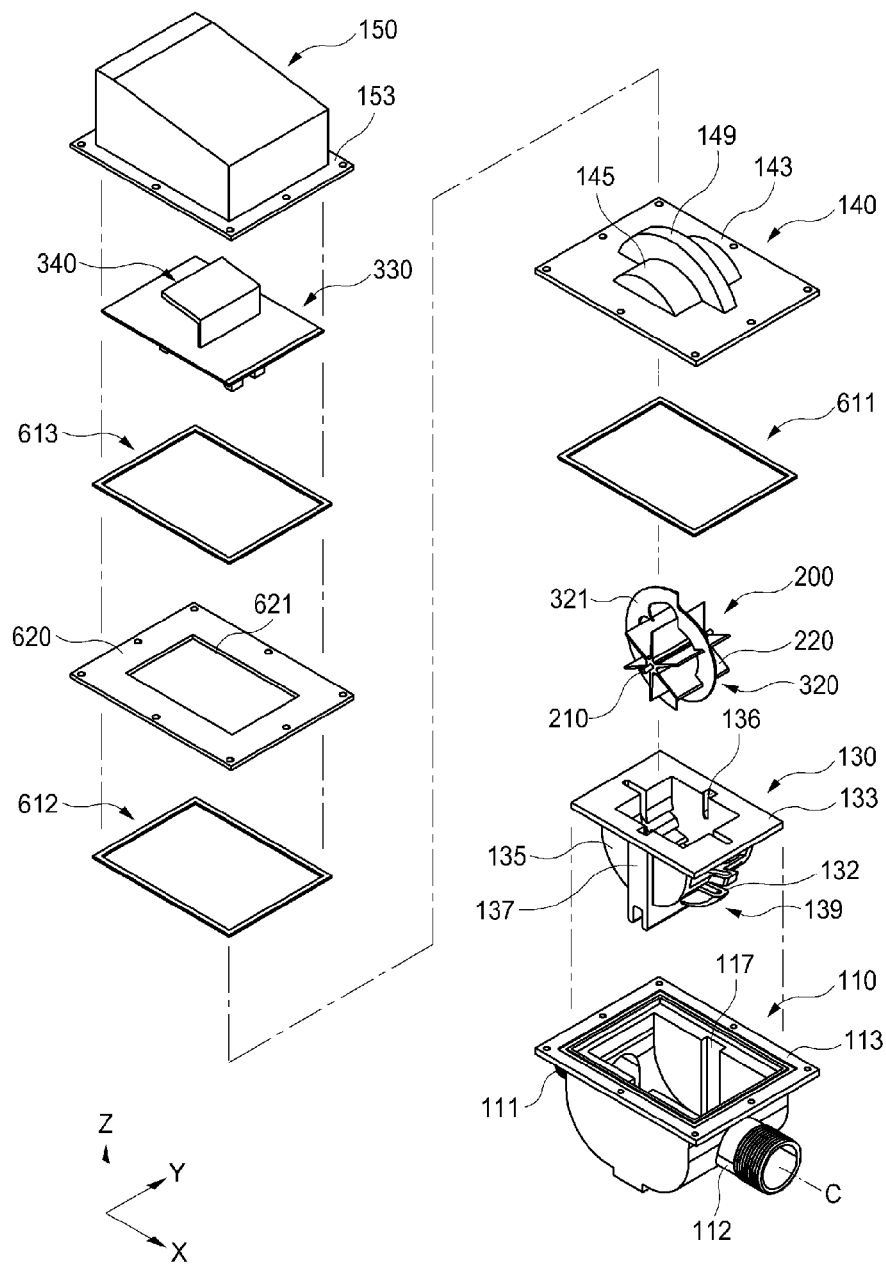
FIG. 2 is an exploded perspective view showing a structure of the flow rate measurement device of FIG. 1.
Figure 3:
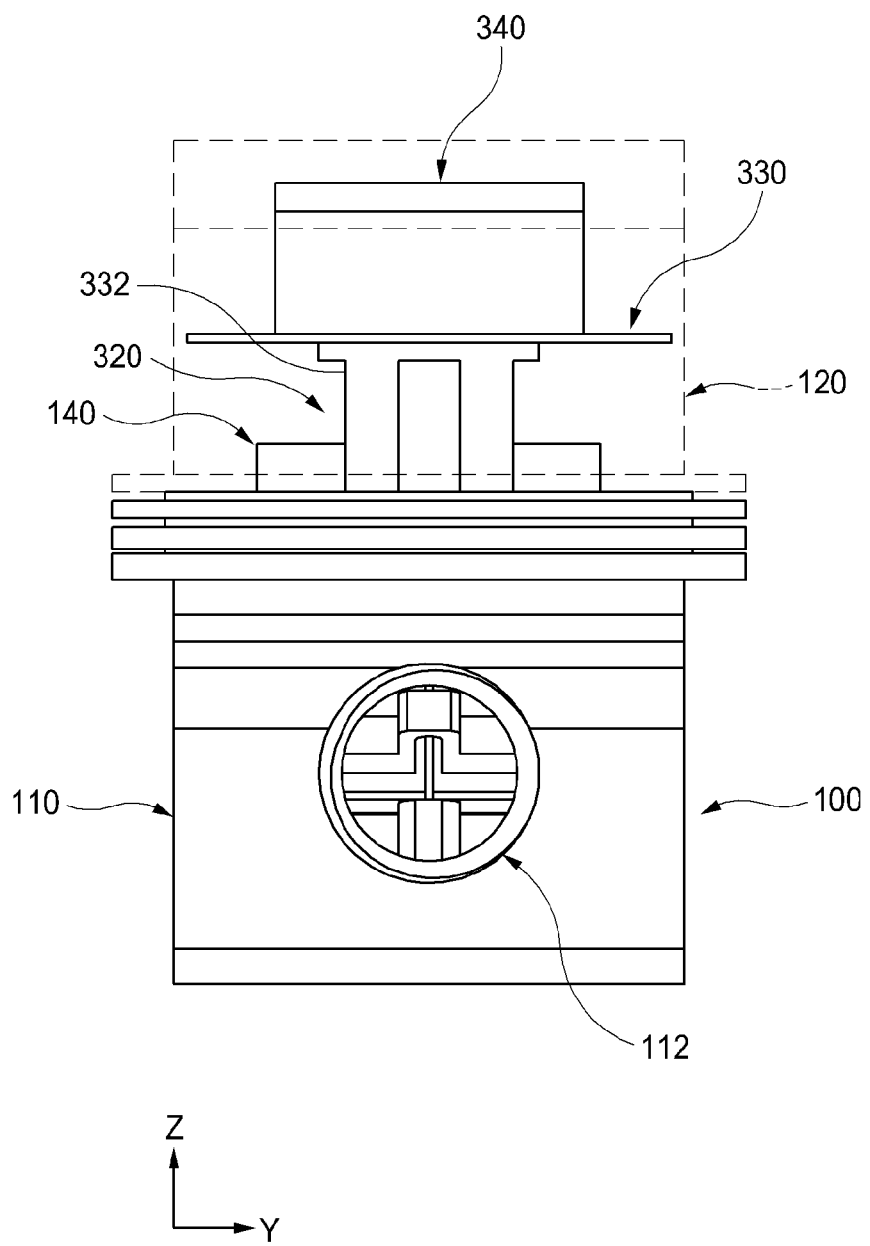
FIG. 3 is a front view showing the flow rate measurement device of FIG. 1 from which a case is removed.

Particularly, the inflow port 131 is preferably formed to face the blade 220 of the rotating portion 200 from the outside of the sub-housing 130, as shown in FIGS. 2 and 4.

In particular, the inflow port 131 is preferably formed so that the fluid passing through the inflow port 131 is directed from one end coupled to the rotating shaft 210 to the other end in the blade 220.

When the inflow port 131 is formed as described above, the resistance of the flow of the fluid according to the formation of the inflow port 131 may be minimized.

The outflow port 132 is formed such that the fluid introduced into the sub-housing 130 causes the blade 220 of the rotating portion 200 to rotate, and then is directed to the discharge port 112, and may be formed as one or more openings.

Particularly, as shown in FIGS. 2 and 4, the outflow port 132 is preferably formed along the direction of rotation of the blade 220 of the rotating portion 200 when viewed from the inside of the sub-housing 130.

In this example, in a case in which the outflow port 132 is formed along the direction of rotation of the blade 220 of the rotating portion 200, when the fluid introduced into the sub-housing 130 causes the blade 220 of the rotating portion 200 to rotate and then is discharged toward the discharge port 112, the resistance of the flow of the fluid according to the formation of the outflow port 132 may be minimized.

Meanwhile, the upper edge of the sub-housing 130 includes a flange portion 133 formed thereon to ensure the stable support by the lower housing 110 described above.

The cover member 140 has a configuration that covers the opening of the sub-housing 130 to form a space in which the rotating portion 200 including the blade 220 is rotated, and may be formed in a cylindrical shape as a whole as described above.

Figure 5:
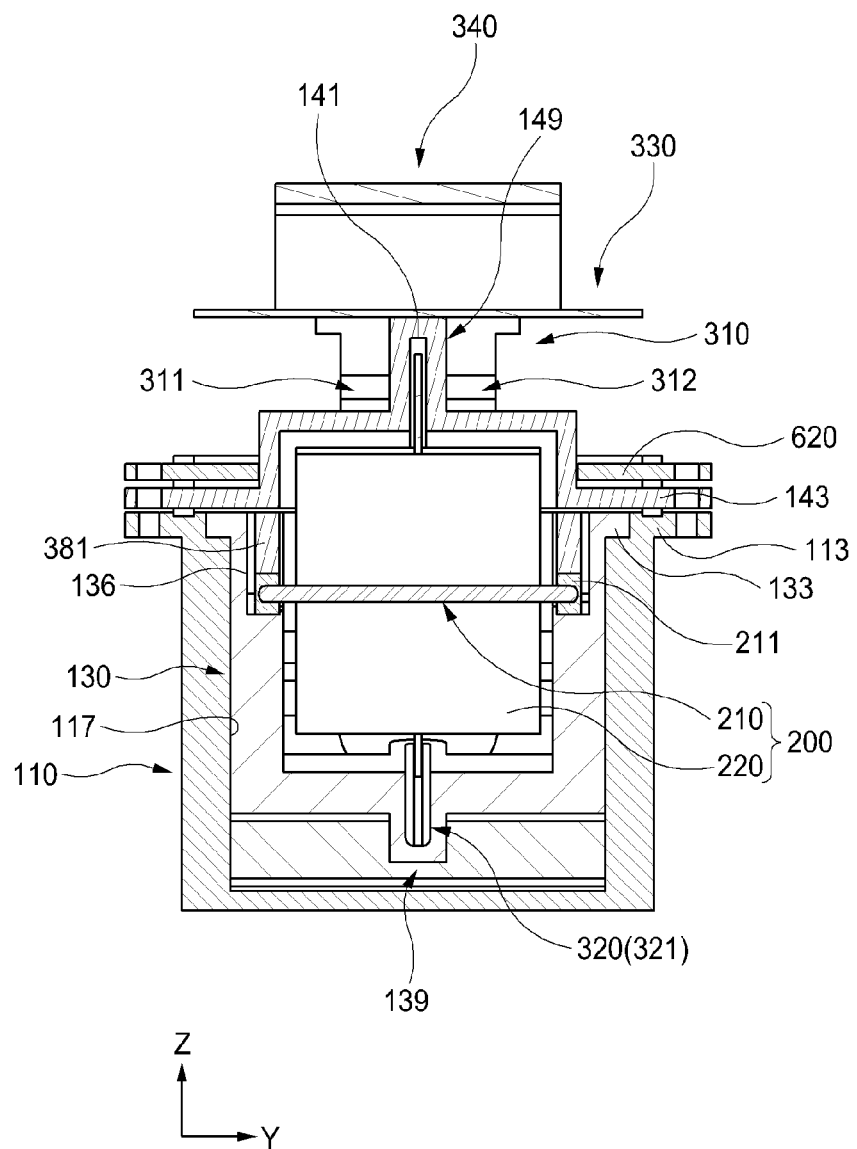
FIG. 5 is a cross-sectional view taken along the line V-V in FIG. 1.

Meanwhile, the cover member 140 may need to be configured to enable sensing of the number of rotations of the rotating portion 200 by the sensor portion, accordingly, the cover member 140 may be configured such that it 140 covers the opening of the sub-housing 130 and includes a first transparent guide groove 141 protruding upward to guide a rotation of the interaction portion 320, as shown in FIG. 5, and various configurations may be applicable.

The first transparent guide groove 141 may be configured such that it 141 protrudes upward from the cover member 140 so as to guide the rotation of the interaction portion 320 while allowing sensing of the number of rotations by the sensor portion, and various configurations may be applicable.

In this example, the first transparent guide groove 141 is formed at a portion having a transparent material capable of transmitting light to allow sensing by the sensor portion using principles of light emission and reception, and for this purpose, the entire cover member 140 may have a transparent material.

The optical path may be vertically passed through the first transparent guide groove 141 such that, when the interaction portion 320 (to be described) is rotated, interference with the cover member 140 may be eliminated and the rotation of the rotating portion 200 can be recognized by the sensor portion.

Therefore, the first transparent guide groove 141 may be formed of a transparent material that can form an optical path so that the rotation of the rotating portion 200 is recognized by the sensor portion, and more specifically, may be formed of a material that can transmit light.

The cover member 140 may be configured such that it 140 is coupled to an upper surface of the sub-housing 130, and specifically, may be coupled by bolt fastening through a plurality of bolt holes formed along the edge of the upper surface.

When the cover member 140 is coupled to the sub-housing 130, the sealing members 611 may be installed between at least one of the lower housing 110 and the sub-housing 130 in order to prevent fluid leakage or the like.

For example, the sealing members 611 are the members installed between at least one of the cover member 140 and the lower housing 110 and the sub-housing 130 to prevent leakage of fluid, and may be a silicon O-ring or the like.

Meanwhile, the sub-housing 130 and the cover member 140 are characterized in that they are coupled with each other to form a cylindrical inner space for the rotation of the rotating portion 200, and specifically, may include rotation guide portions 139 and 149 extending to protrude from the inner circumferential surface of the cylindrical inner space in the radial direction of the rotating shaft 210 to allow a rotation of the blocking portion 321—the interaction portion 320—extending in the radial direction of the rotating shaft 210.

The rotation guide portions 139 and 149 are configured such that they 139 and 147 extend from the inner circumferential surface of the cylindrical inner space that is, extend from each of the sub-housing 130 and the cover member 140 in the radial direction of the rotating shaft 210 in order to allow a rotation of the blocking portion 321—the interaction portion 320—that extends in the radial direction of the rotating shaft 210, and various configurations may be applicable.

Meanwhile, the sub-housing 130 may include a pair of rotating shaft guide grooves 136 formed on an inner circumferential surface such that the rotating shaft 210 can be inserted from the upper side.

The rotating shaft guide groove 136 may extend from the upper side to the lower side into a concave form in such a size that corresponds to the rotating shaft 210 and a bearing 211 coupled thereto such that the rotating shaft 210 can be inserted from the upper side.

Meanwhile, the rotating shaft 210 coupled with the bearing 211 may be pushed upward by the pressure of the fluid after being inserted in the rotating shaft guide groove 136 from the upper side to the lower side, and in order to prevent this, it is preferable that a pressing portion 381 is further formed, which presses the bearing 211 downward once the rotating shaft 210 coupled with the bearing 211 is inserted into the rotating shaft guide groove 136 from the upper side to the lower side.

The pressing portion 381 has a shape corresponding to the rotating shaft guide groove 136, and various configurations may be applicable, such as, formed as an independent member or protruding downward from the bottom surface of the cover member 140, and so on.

More preferably, the pressing portion 381 may be formed by integral injection with the cover member 140 so as to protrude downward from the bottom surface of the cover member 140.

In addition, the sub-housing 130 may include a protruding guide portion 137 formed on an outer circumferential surface, in which the protruding guide portion 137 may correspond to the rotating shaft guide grooves 136 and be inserted along the second guide groove 117 formed on the inner circumferential surface of the lower housing 110 such that the rotating shaft 210 may be arranged perpendicularly to the virtual line C connecting the inlet port 111 and the discharge port 112.

The protruding guide portion 130 may be configured such that it 130 corresponds to the rotating shaft guide grooves 136 and is formed on the outer circumferential surface of the sub-housing 130 and inserted along the second guide groove 117 formed on the inner circumferential surface of the lower housing 110 such that the rotating shaft 210 may be arranged perpendicularly to the virtual line C connecting the inlet port 111 and the discharge port 112.

For example, when viewed from the side of the sub-housing 130, the protruding guide portion 137 may include a concave groove sunken at a central portion, and through this, the rotating shaft 210 and the bearing 211 in close contact may be inserted.

The rotating portion 200 may be configured such that it 200 includes a rotating shaft 210 arranged perpendicularly to the virtual line C connecting the inlet port 111 and the discharge port 112 inside the housing 100, and a blade 220 rotated by a flow of the fluid around the rotating shaft 210, and various configurations may be applicable.

The rotating shaft 210 is a rotating shaft on which a plurality of blades 220 are coupled, and forms an axis of rotation for the plurality of blades 220 rotated by hydraulic pressure of fluid, that is, water pressure.

In this example, the rotating shaft 210 is preferably arranged inside the housing 100 perpendicularly to the virtual line C connecting the inlet port 111 and the discharge port 112 for the stable rotation of the blade 220 and the stable support by the housing 100, particularly, by the sub-housing 130.

In addition, for a long life, the material of the rotating shaft 210 is preferably a material such as artificial zirconia, artificial sapphire, ceramic, and so on, which is light in weight and has high wear resistance.

At this time, both ends of the rotating shaft 210 are preferably provided with a cylindrical bearing 211 formed of a material such as artificial zirconia, artificial sapphire, ceramic, and so on, so as to rotatably supported on the housing 100, particularly, on the sub-housing 130.

The bearing 211 is installed in the housing 100, or particularly, in the sub-housing 130 to rotatably support both ends of the rotating shaft 210, and various configurations may be applicable.

For example, the bearing 211 may be installed such that the rotating shaft 210 does not penetrate, but only partially inserted, as shown in FIGS. 5, 6A, and 6B.

In addition, the end of the rotating shaft 210 may be in a curved shape, for example, a hemispheric shape, and the bearing 211 may be formed in a concave shape to correspond to the shape of the end of the rotating shaft 210.

Meanwhile, the rotating shaft 210 is preferably installed in the housing 100, or particularly in the sub-housing 130, so that the flow path of the fluid connecting the inlet port 111 and the outlet port 112 is located on one side of the rotating shaft 210.

The blades 220 may be configured such that they 220 are rotated by the flow of the fluid around the rotating shaft 210, and may be formed integrally with the rotating shaft 210 or may be formed separately therefrom, and preferably arranged in plural numbers along the circumferential direction around the rotating shaft 210.

For example, the blades 210 may be formed in plural numbers as a whole, and may include an insertion hole formed at a center to allow the rotating shaft 210 to be inserted in the vertical direction.

In addition, the cross-sectional shape of the end of the blade 220 in the direction perpendicular to the rotating shaft 210 is preferably formed in a flat shape on the front side and in a streamlined shape on the rear side based on the direction of rotation of the rotating shaft 210.

Meanwhile, the blade 220 may have a rectangular shape with its longitudinal direction corresponding to the rotating shaft 210.

The control portion 330 may be configured such that it 330 measures the flow rate of the fluid on the basis of the number of rotations of the rotating portion 200 sensed by the sensor portion, and various configurations may be applicable.

In this example, the control portion 330 may be configured such that it 330 measures the flow rate of the fluid on the basis of the number of rotations of the rotating portion 200 sensed by the sensor portion, and may be configured for signal transmission, numerical calculation, and the like, rather than provided in a physical configuration, and configured as one or more PCBs 331 on which chips, sensors, and the like are installed.

In addition, the PCB 331 may be provided with one or more supporting portions 332 for support and connection to a sensor portion described below.

In addition, the PCB 331 may be provided with, on the upper side, a supporting portion 333 for supporting the display portion 340 described above.

Meanwhile, the control portion 330 may measure the flow rate of the fluid by sensing the number of rotations of the rotating portion 200 and, further, the direction of rotation on the basis of the sensing result from the sensor portion, using a flow rate measurement method and a fluid flow direction determination method which will be described below.

The sensor portion may be configured such that it is arranged to be spaced apart from the rotating shaft 210 in the radial direction of the rotating shaft 210 to sense the number of rotations of the rotating portion 200, and various configurations may be applicable.

For example, the sensor portion may include: a first sensing portion 310 installed to be spaced apart from the rotating shaft 210 in the radial direction of the rotating shaft 210; and an interaction portion 320 coupled radially to the blade 220 such that the rotation of the rotating portion 200 is recognized by an interaction with the first sensing portion 310.

The first sensing portion 310 may be configured such that it 310 is installed to be spaced apart from the rotating shaft 210 in the radial direction of the rotating shaft 210 to sense the number of rotations of the rotating portion 200, and various configurations may be applicable according to the rotation sensing method of the rotating portion 200.

For example, the first sensing portion 310 may be configured such that it 310 senses the number of rotations of the rotating portion 200 through light emission and light reception, and may include a first light emitting portion 311 that generates light in the axial direction of the rotating shaft 210 and a first light receiving portion 312 arranged to be spaced apart from the first light emitting portion 311 in the axial direction of the rotating shaft 210 to receive the light emitted from the first light emitting portion 311, as shown in FIGS. 4 to 7B and 12.

The first light emitting portion 311 may be configured such that it 311 generates light in the axial direction of the rotating shaft 210, and various configurations may be applicable.

In addition, the first light receiving portion 312 may be configured such that it 312 is arranged to be spaced apart from the first light emitting portion 311 in the axial direction of the rotating shaft 210 to receive the light emitted from the first light emitting portion 311, and various configurations may be applicable. In this example, the method of sensing the number of rotations by the first sensing portion 210 will be described in detail with reference to the flow rate measurement process described below.

Meanwhile, as shown, since it is more preferable to measure the direction of rotation of the rotating portion 200 in addition to sensing the number of rotations of the rotating portion 200, and accordingly, the sensor portion may further include a second sensing portion 350 arranged to have a preset angle difference, preferably an angle difference of 90° with the first sensing portion 310 around the rotating shaft 210, to sense the direction of rotation of the rotating portion 200 together with the first sensing portion 310.

The second sensing portion 350 may be configured such that it 350 is arranged to have a preset angle difference, or preferably, an angle difference of 90° with the first sensing portion 310 around the rotating shaft 210, to sense the direction of rotation of the rotating portion 200 together with the first sensing portion 310, and various configurations may be applicable.

For example, the second sensing portion 350 may include a second light emitting portion 351 that generates light in the axial direction of the rotating shaft 210 and a second light receiving portion 352 arranged to be spaced apart from the second light emitting portion 351 in the axial direction of the rotating shaft 210 to receive the light emitted from the second light emitting portion 351.

In this example, the control portion 330 determines the direction of rotation of the rotating portion 200 according to whether light to the first light receiving portion 312 and the second light receiving portion 352 is blocked.

Since the flow rate measurement process is sensed using only the first sensing portion 310, the process of sensing the direction of rotation of the rotating portion 200 using the configuration of the second sensing portion 350 will be described below in detail with reference to the flow rate measurement process described below.

The interaction portion 320 may be configured such that it 320 is radially coupled to the blade 220 such that rotation of the rotating portion 200 is recognized by interaction with the first sensing portion 310, and various configurations may be applicable.

For example, the interaction portion 320 may include one or more blocking portions 321 arranged at an angle difference of 180°/N (N is a natural number of 1 or more) to be able to alternately block and unblock an optical path between the first light emitting portion 311 and the first light receiving portion 312 by the rotation of the rotating shaft 210.

The blocking portion 321 may be configured such that one or more blocking portions 321 are arranged at an angle difference of 180°/N (N is a natural number of 1 or more) around the rotating shaft 210 to alternately block and unblock the optical path between the first light emitting portion 311 and the first light receiving portion 312 by the rotation of the rotating shaft 210, and various configurations may be applicable.

More specifically, the blocking portion 321 may be formed of an arc-shaped plate having an angle of 180°/N (N is a natural number of 1 or more) around the rotating shaft 210.

When the flow rate measurement process (for measuring the number of rotations) and the direction of rotation determination process (for determining the direction of rotation) are performed at the same time, both the first sensing portion 310 and the second sensing portion 320 are used, in which case the interaction portion 320 may be configured such that it 320 is radially coupled to the blade 220 such that the rotation of the rotating portion 200 is recognized by the interaction with the first sensing portion 310 and the direction of rotation is determined by the interaction with the second sensing portion 350, and various configurations may be applicable.

For example, the interaction portion 320 may include one or more blocking portions 321 arranged at an angle difference of 180°/P (P is an odd number of 1 or more) to be able to alternately block and unblock an optical path between the first light emitting portion 311 and the first light receiving portion 312 and between the second light emitting portion 351 and the second light receiving portion 352 by the rotation of the rotating shaft 210.

The blocking portion 321 may be configured such that one or more block portions 321 are arranged at an angle difference of 180°/P (P is an odd number of 1 or more) around the rotating shaft 210 to alternately block and unblock the optical path between the first light emitting portion 311 and the first light receiving portion 312 and between the second light emitting portion 351 and the second light receiving portion 352 by the rotation of the rotating shaft 210, and various configurations may be applicable.

More specifically, the blocking portion 321 may be formed of an arc-shaped plate having an angle of 180°/P (P is an odd number of 1 or more) around the rotating shaft 210.

In addition, the blocking portion 321 may be integrally formed by being connected along the circumferential direction around the rotating shaft 210, as shown in FIGS. 10A and 10B and FIGS. 11A to 11O.

Specifically, the blade 220 has a rectangular shape arranged in the longitudinal direction of the rotating shaft 210, and coupled, at one end, to the rotating shaft 210.

Figure 11A:
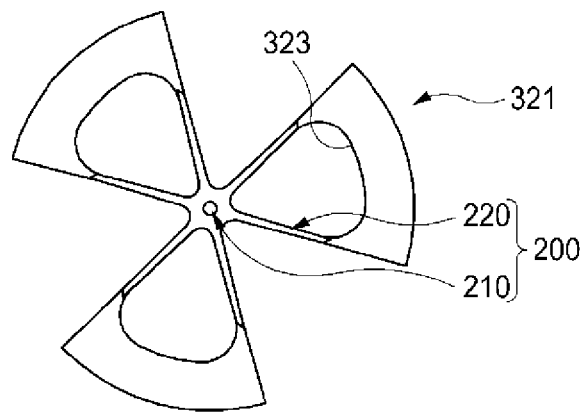
FIGS. 11A and 11B are a perspective view and a side view showing an example in which there are three blocking portions provided in the flow rate measurement device of FIG. 1.
Figure 11B:
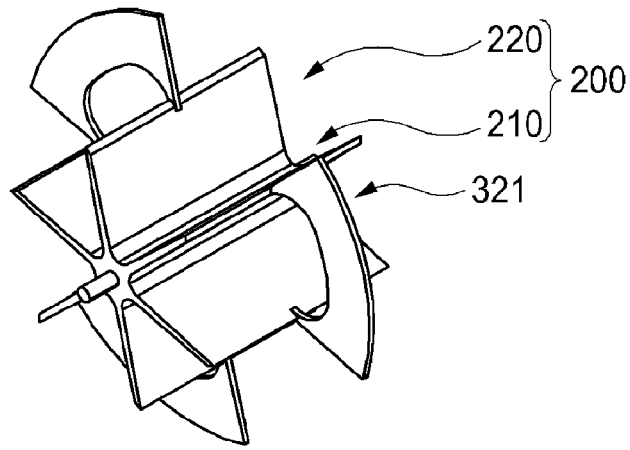

At this time, the blocking portion 321 may be formed of an opaque material by integral injection with the blade 220, as shown in FIGS. 11A and 11B.

Figure 10A:
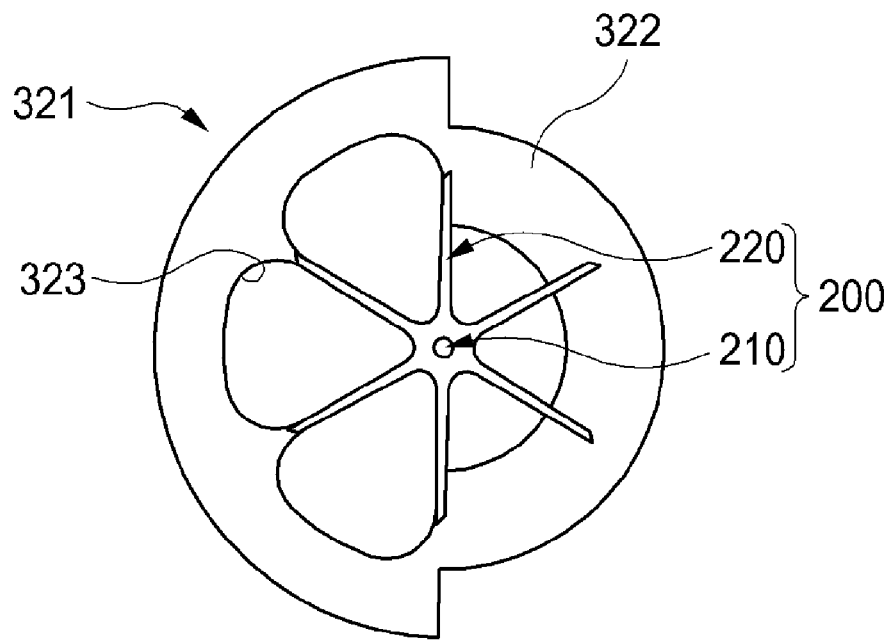
FIGS. 10A and 10B are a perspective view and a side view showing an example of a blade and a blocking portion of the flow rate measurement device of FIG. 1.
Figure 10B:
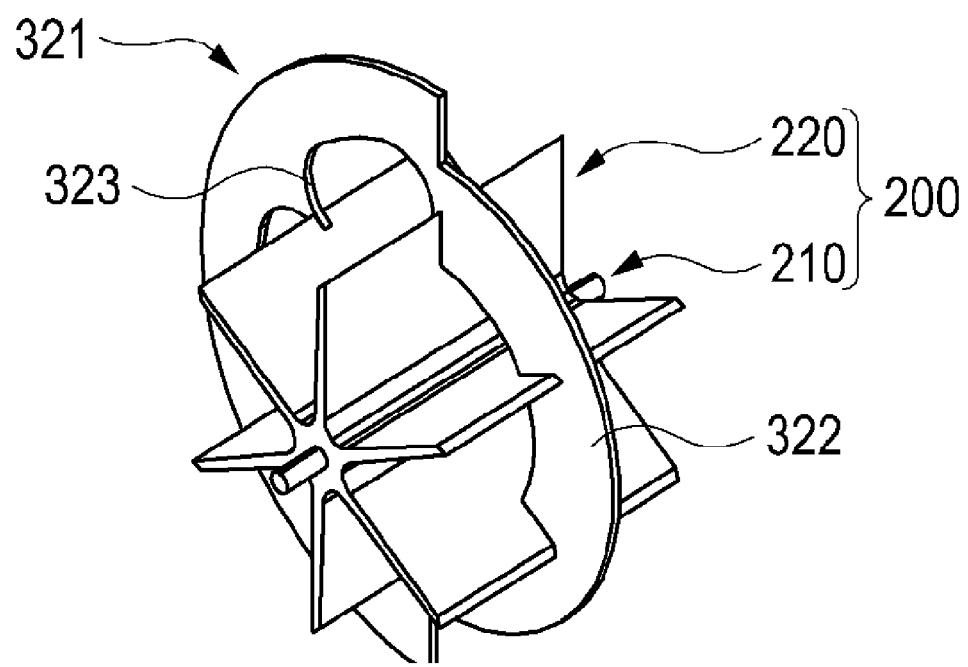
Figure 11C:
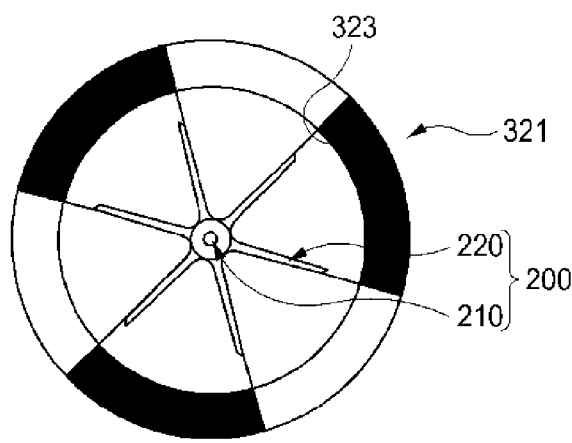
FIG. 11C is a side view showing an example in which the blocking portion of the flow rate measurement device of FIG. 1 is fabricated by double injection with an opaque material and a transparent material.

In addition, the blocking portion 321 may be formed of a transparent material and an opaque material by double injection as shown in FIG. 11C. Even when there is only one blocking portion (FIGS. 10A and 10B), it may be formed by applying the same double injection method that uses the transparent material and the opaque material.

In addition, as shown in FIGS. 10A and 10B, for example, the blocking portion 321 is formed of an arc-shaped plates having an angle of 180° around the rotating shaft 210, and may further include a semicircular connecting portion 322 connecting both ends of the blocking portion 321 to each other along a circumferential direction around the rotating shaft 210.

Furthermore, the blocking portion 321 is preferably formed by cutting and removing a portion of the plate except for the light blocking portion in order to minimize rotational inertia.

In addition, as shown in FIGS. 10A and 10B and FIGS. 11A to 11B, the blocking portion 321 may be divided into a plurality of areas around the rotating shaft 210.

In addition, the blocking portion 321 is preferably arranged at the center of the blades 220 in the longitudinal direction of the rotating shaft 210.

Meanwhile, the blocking portion 321 may be arranged at 180°/N (N is a natural number of 1 or more) along the circumferential direction when only the flow sensing is applied, in which case it 321 is preferably installed with a circumferential angle of 180°/N (N is a natural number of 1 or more) and with an angle difference of 180°/N (N is a natural number of 1 or more).

Meanwhile, the blocking portion 321 may be arranged at 180°/P (P is an odd number of 1 or more) along the circumferential direction when the flow rate sensing and the direction of rotation sensing are applied together, in which case it 321 is preferably installed with a circumferential angle of 180°/P (P is odd number of 1 or more) and with an angle difference of 180°/P (P is odd number of 1 or more).

In addition, when the first sensing portion 310 for sensing the flow rate is installed, it is preferable that one or more blocking portions 321 are installed, and when the second sensing portion 350 for sensing the direction of rotation is provided in addition to the first sensing portion 310 for sensing the flow rate, it is preferable that an odd number of blocking portions 321 are installed.

The flow rate measurement process using the flow rate measurement device according to the present invention will be described in detail with reference to the accompanying drawings.

Figure 12:
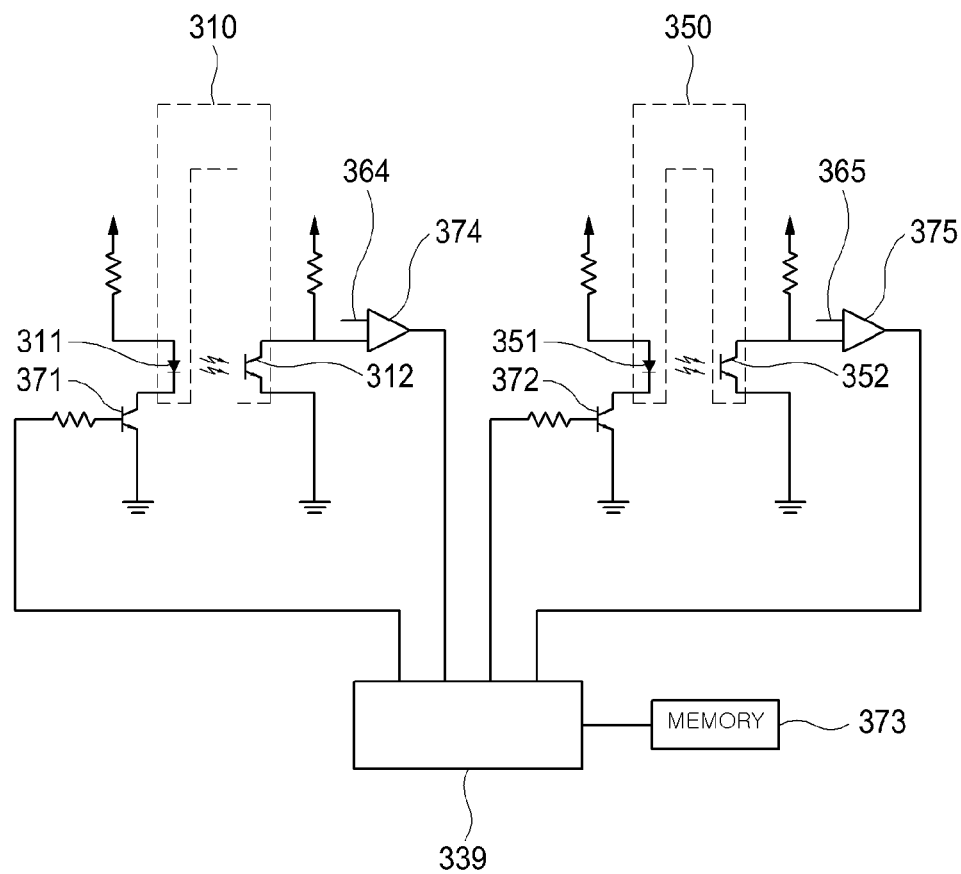
FIG. 12 is a circuit diagram showing a signal transfer between the control portion and the sensing portion of the flow rate measurement device of FIG. 1.
Figure 13:
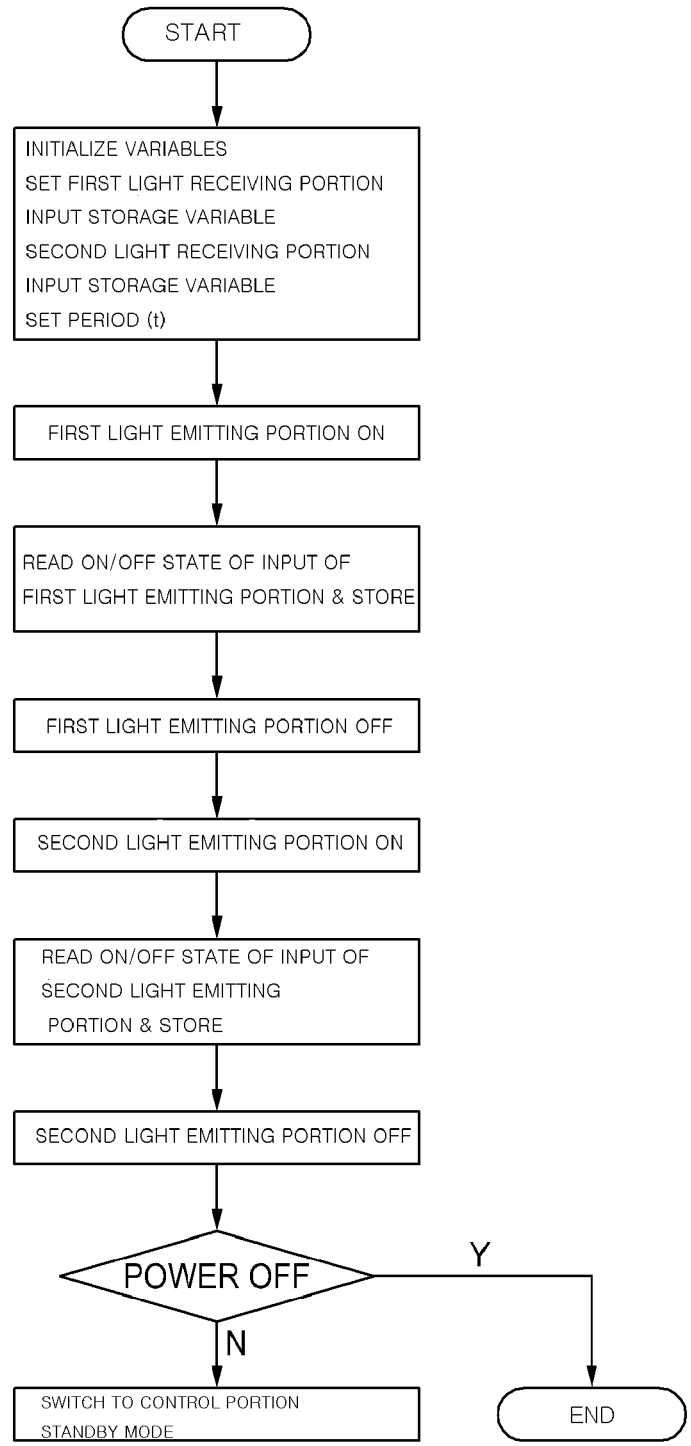
FIG. 13 is a flowchart of a main routine of power-on, setting of initial values such as setting of various variables and standby mode time, and so on, initial reading and storage of sensor values, and entry into standby mode.

First, as shown in FIG. 12, the control portion 330 may include a first switch 371 selectively turned on/off to instruct the first light emitting portion 311 to transmit a signal, a second switch 372 selectively turned on/off to instruct the second light emitting portion 351 to transmit a signal, a central control portion 339 that outputs signals for on/off operation of the first and second switches 371 and 372, a memory 373 for storing status information of the first sensing portion 310 and the second sensing portion 350, a first comparison portion 374 configured to compare the output signal of the first light receiving portion 312 with a reference signal and output the corresponding signal, and a second comparison portion 375 configured to compare the output signal of the second light receiving portion 352 with a reference signal and output the corresponding signal.

Meanwhile, when the flow rate measurement device according to the present invention includes only the first sensing portion 310, it goes without saying that the configuration and operation of the second sensing portion 350 may be omitted.

At this time, the first sensing portion 310 and the second sensing portion 350 may form a preset angle difference as described above with the first sensing portion 310 around the rotating shaft 210, and more preferably, are arranged to have an angle difference of 90°.

The central control portion 339 outputs signals for the on/off operation of the first and second switches 371 and 372, and may turn on/off the light emission of the first light emitting portion 311 and the second light emitting portion 351, respectively, through the on/off operations of the first and second switches 371 and 372.

When the light of the first light emitting portion 311 and the second light emitting portion 351 is blocked by the blocking portion 321, the first light receiving portion 312 and the second light receiving portion 352 are respectively turned OFF, in which case, each voltage input to the first comparison portion 374 and second comparison portion 375 is higher than the reference voltages 364 and 365 of each reference terminal of the first comparison portion 374 and second comparison portion 375, and the outputs 310 and 350 of the first and second comparison portions 374 and 375 become Hi, respectively.

Meanwhile, in areas without the blocking portion 321, the light emitted from the first light emitting portion 311 and the second light emitting portion 351 is received by the first light receiving portion 312 and the second light receiving portion 352, respectively, and the first light receiving portion 312 and the second light receiving portion 352 are turned ON, respectively, in which case, the respective voltages input to the first comparison portion 374 and the second comparison portion 375 are lower than the reference voltages 364 and 365 of each reference terminal of the first comparison portion 374 and second comparison portion 375, and the outputs 31 and 350 of the first comparison portion 374 and the second comparison portion 375 become Low, respectively.

Meanwhile, the signals of the first light receiving portion 312 and the second light receiving portion 352 are received through the input terminal, and the comparison portions 374 and 375 may operate to output a Hi signal when the signals input to the input terminal of the comparator is greater than the reference voltages 364 and 365 of each reference terminals of the comparator, and output a Low signal when the signals input to the input terminal is lower than the reference voltage, or the reverse configuration is applicable.

The comparison portions 374 and 375 form a Schmitt trigger circuit, respectively, so as to have hysteresis, thereby eliminating errors that may occur in an intermediate stage between the blocking portion and the opening.

Accordingly, the present invention relates to a flow rate measurement method using a flow rate measurement device including: a housing 100 including an inlet port 111 and a discharge port 112 for a fluid, which are formed to face each other; a rotating portion 200 including a rotating shaft 210 arranged inside the housing 100 and a blade 220 rotated by a flow of the fluid around the rotating shaft 210; a sensor portion arranged to be spaced apart from the rotating shaft 210 in a radial direction of the rotating shaft 210 so as to sense a number of rotations of the rotating portion 200, and including a first light emitting portion 311 that generates light in an axial direction of the rotating shaft 210, and a first light receiving portion 312 that is spaced apart from the first light emitting portion 311 in the axial direction of the rotating shaft 210 to receive the light emitted from the first light emitting portion 311; and a control portion 330 that measures a flow rate of the fluid on the basis of the number of rotations of the rotating portion 200 sensed by the sensor portion, in which the flow rate measurement method may include: a light emitting step, at the first light emitting portion 311, of emitting light toward the first light receiving portion 312; a storage step, at the control portion 330, of determining whether the first light receiving portion 312 receives the light and storing a result value accordingly; and an off step of turning off the light emission of the first light emitting portion 311, in which the flow rate may be measured by repeating the light emitting step, the storage step and the off step at a set period (t) interval, and counting the number of rotations of the rotating portion 200 on the basis of a number of times the result value according to whether the light is received in the storage step is changed.

The structure and detailed description of the flow rate measurement device using the flow rate measurement method have been described above, and thus will be omitted below. However, the flow rate measurement method according to the present invention is not limited to the flow rate measurement device shown in FIGS. 1 to 12, but is applicable regardless of the arrangement of the rotating shaft 210 of the rotating portion 200.

Meanwhile, the flow rate measurement method using the flow rate measurement device according to the present invention may include an initializing step of initializing various variable values at an initial stage, which may be a step of initializing a state value of the first light receiving portion 312 of the first sensing portion 310, a state value of the second light receiving portion 352 of the second sensing portion 350, the set period (t), and so on, and may be a step of initializing the entire startup of the device.

In the light emitting step, the central control portion 339 may be maintained in a standby mode, and then wakes up in an active mode by an interrupt after the set period (t), and transmits a signal to the first switch 271, and turns on the first switch 271 to activate the first light emitting portion 311.

At this time, when only the first sensing portion 310 is used, the set period (t) is preferably shorter than a shorter time duration between a time duration during which the blocking portion 321 passes the first sensing portion 310 and a time duration during which the remaining portion other than the blocking portion 321 passes the first sensing portion 310, and when both the first sensing portion 31 and the second sensing portion 350 are used, the set period (t) is preferably set to be shorter than ½ of the shorter time duration between the time duration during which the blocking portion 321 passes the first sensing portion 310 and the time duration during which the remaining portion other than the blocking portion 321 passes the first sensing portion 310.

In the storage step, different signals may be transmitted to the central control portion 339 according to whether the first light receiving portion 312 receives light, and the result value may be stored in the memory 273.

For example, as the blocking portion 321 blocks the optical path between the first light emitting portion 311 and the first light receiving portion 312, the first light receiving portion 312 does not receive light, in which case the state of Hi is output, and when the optical path is unblocked due to the rotation of the blocking portion 321, the state of the first light receiving portion 312 is in a light receiving state, in which case Low may be output.

Therefore, the output of Hi from the first light receiving portion 312 means that the first light receiving portion 312 is in a state of not receiving light due to blocking of the blocking portion 321, while the output of Low from the first light receiving portion 312 means that the first light receiving portion 312 is in a state of receiving light due to the opening of an optical path.

The off step refers to a step of discontinuing the light emission of the first light emitting portion 311.

More specifically, as the first switch 371 changes from the on state to the off state, the light emission of the first light emitting portion 311 is ceased, and the control portion 330 can switch to the standby mode.

The light emitting step, the storage step, and the off step are repeated at the set period (t), and the number of times of having a change in the state of the first light receiving portion 312 is counted, and in this way, the number of rotations of the rotating portion 200 may be recognized.

As a result, since the number of rotations of the rotating portion 200 means a flow rate, the flow rate may be measured.

As a specific embodiment, when the control portion is activated from the standby mode to the active mode by an interrupt after the set period (t), as shown in FIGS. 14 to 18B, the first light emitting portion 311 changes to the ON state, the state of the first light receiving portion 312 is read and stored in the memory 373, and the first light emitting portion 311 changes to the OFF state.

Figure 14:
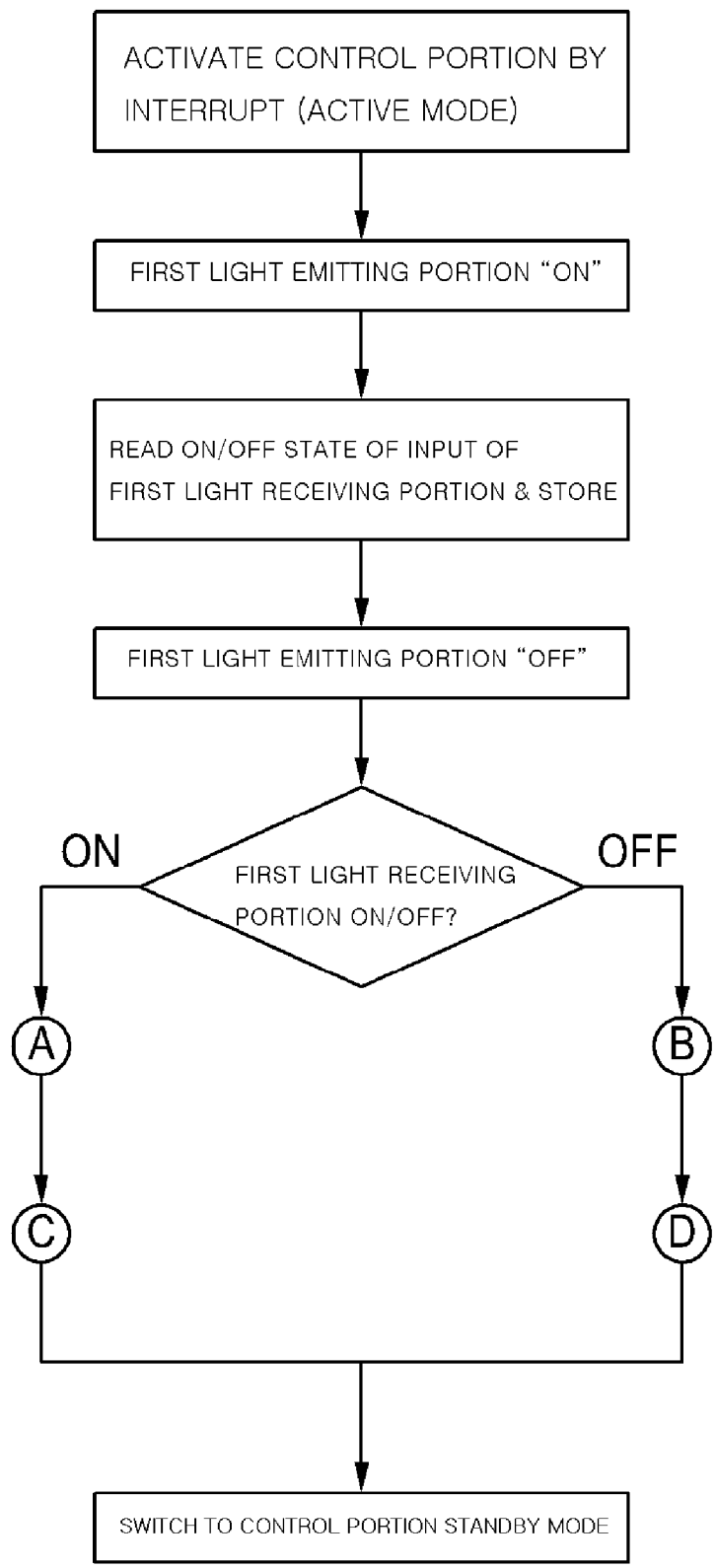
FIG. 14 is a flowchart showing an example of a flow rate measurement process by the flow rate measurement device of FIG. 1.
Figure 15A:
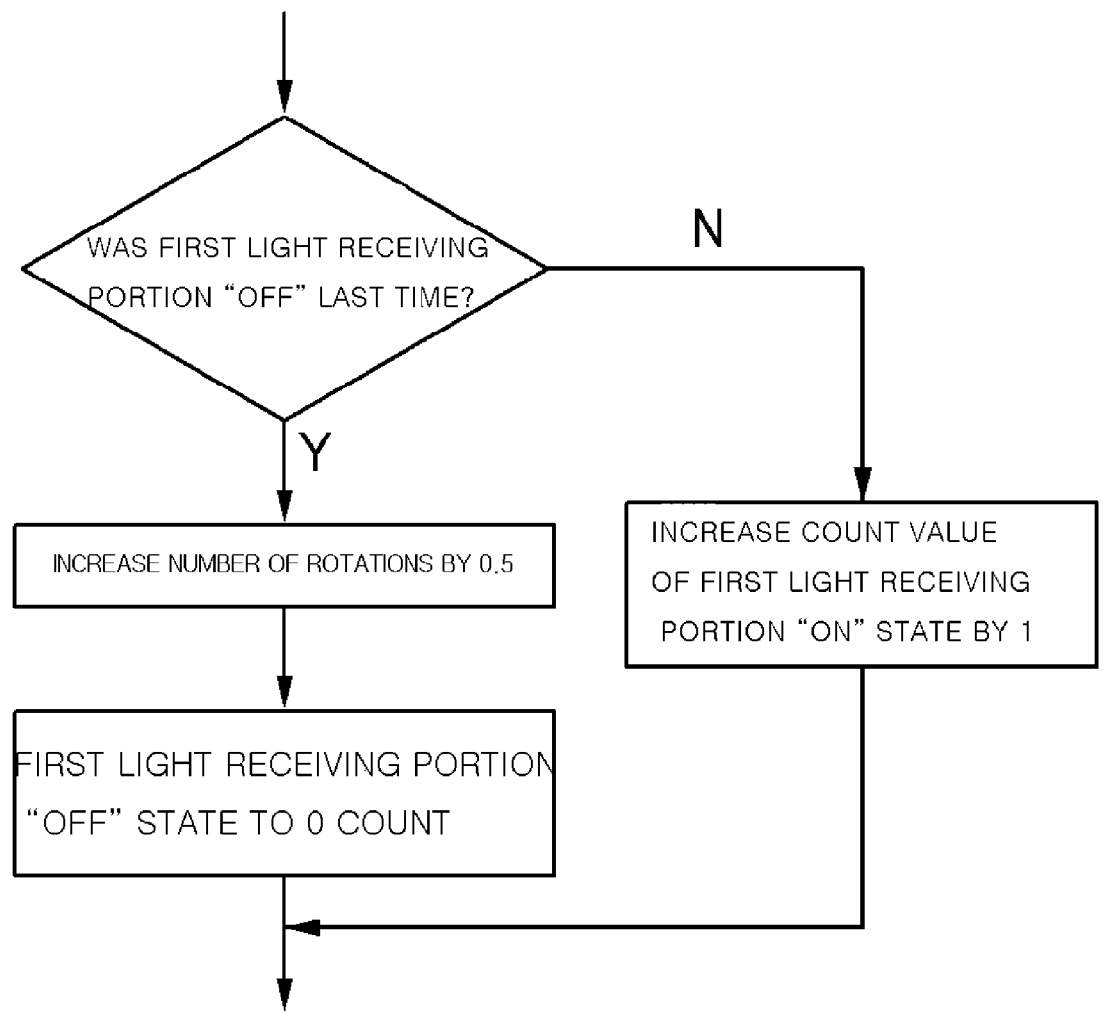
FIG. 15A is a flowchart showing an example of process A in FIG. 14.
Figure 15B:
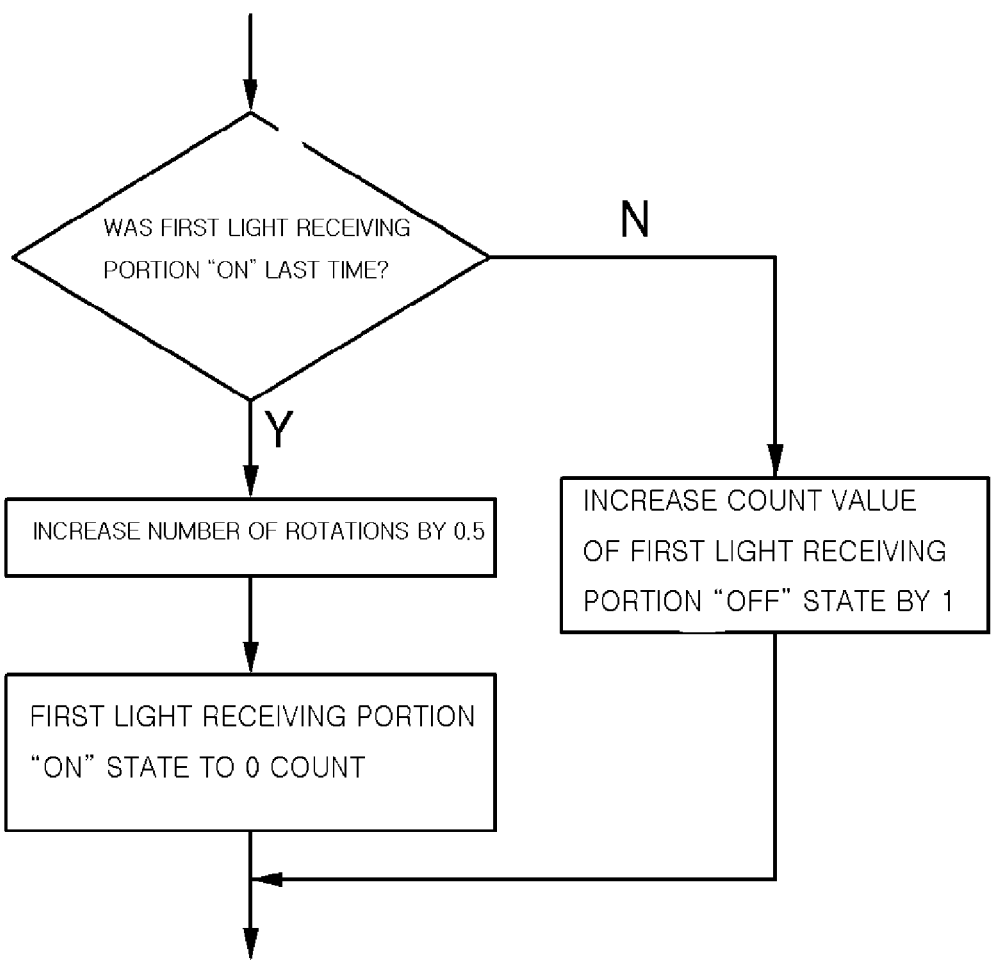
FIG. 15B is a flowchart showing an example of process B in FIG. 14.
Figure 16A:
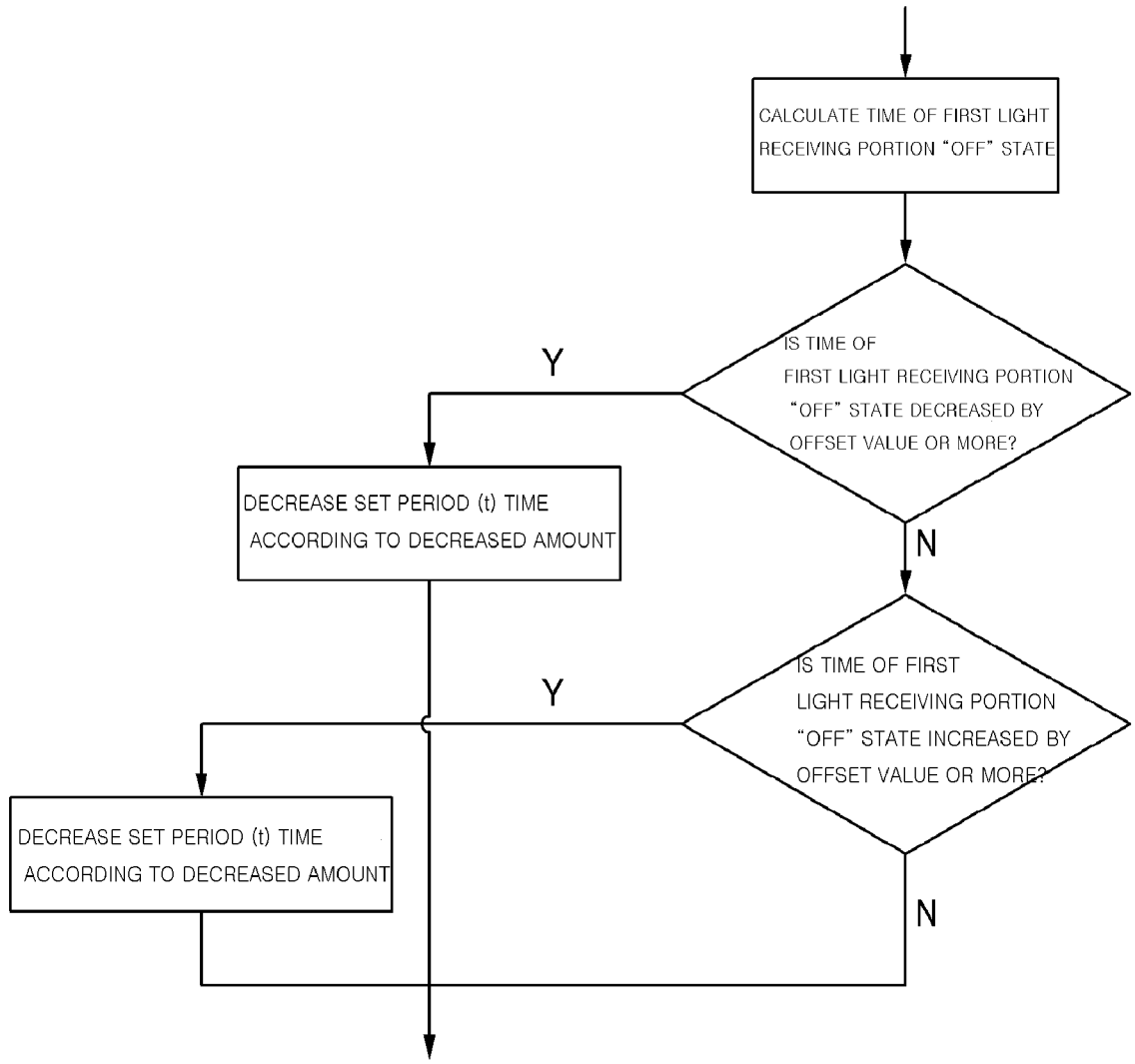
FIG. 16A is a flowchart showing an example of process C in FIG. 14.
Figure 16B:
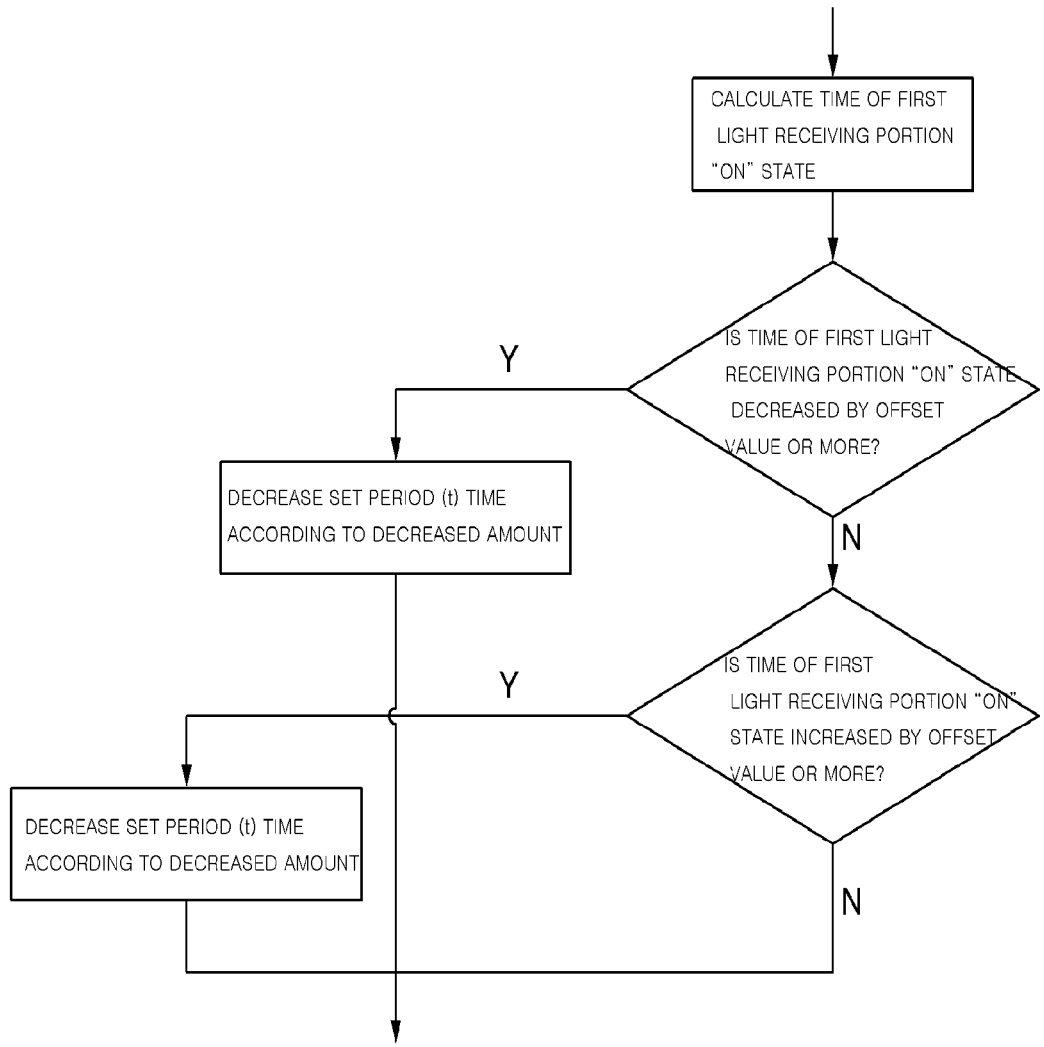
FIG. 16B is a flowchart showing an example of process D in FIG. 14.
Figure 17A:
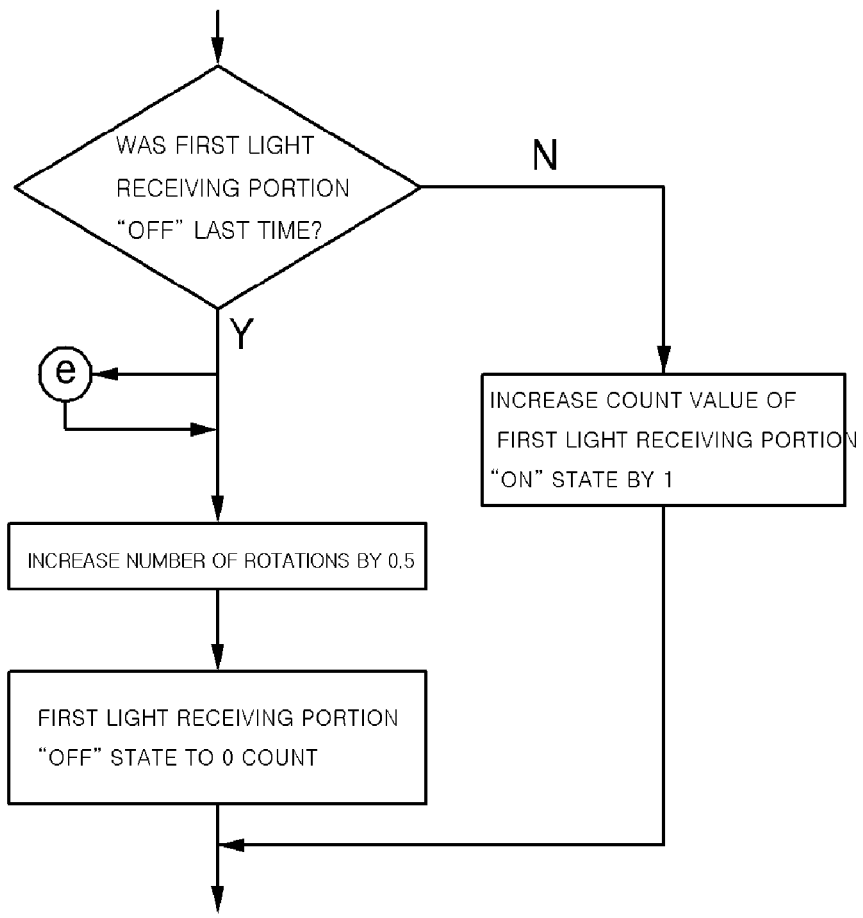
FIG. 17A is a flowchart showing another example of the process A in the flow rate measurement process by the flow rate measurement device of FIG. 14.
Figure 17B:
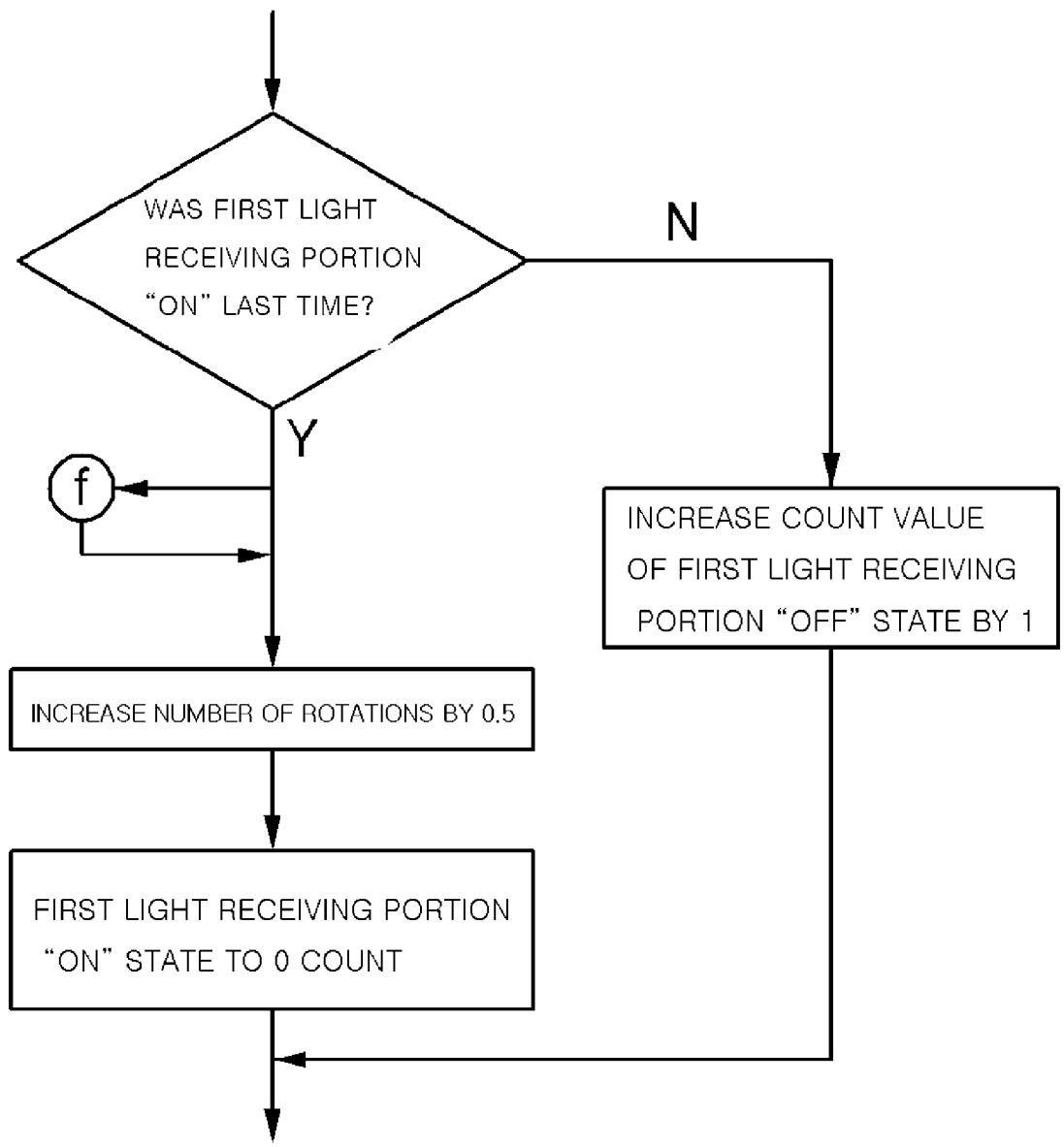
FIG. 17B is a flowchart showing another example of the process B in the flow rate measurement process by the flow rate measurement device of FIG. 14.
Figure 18A:
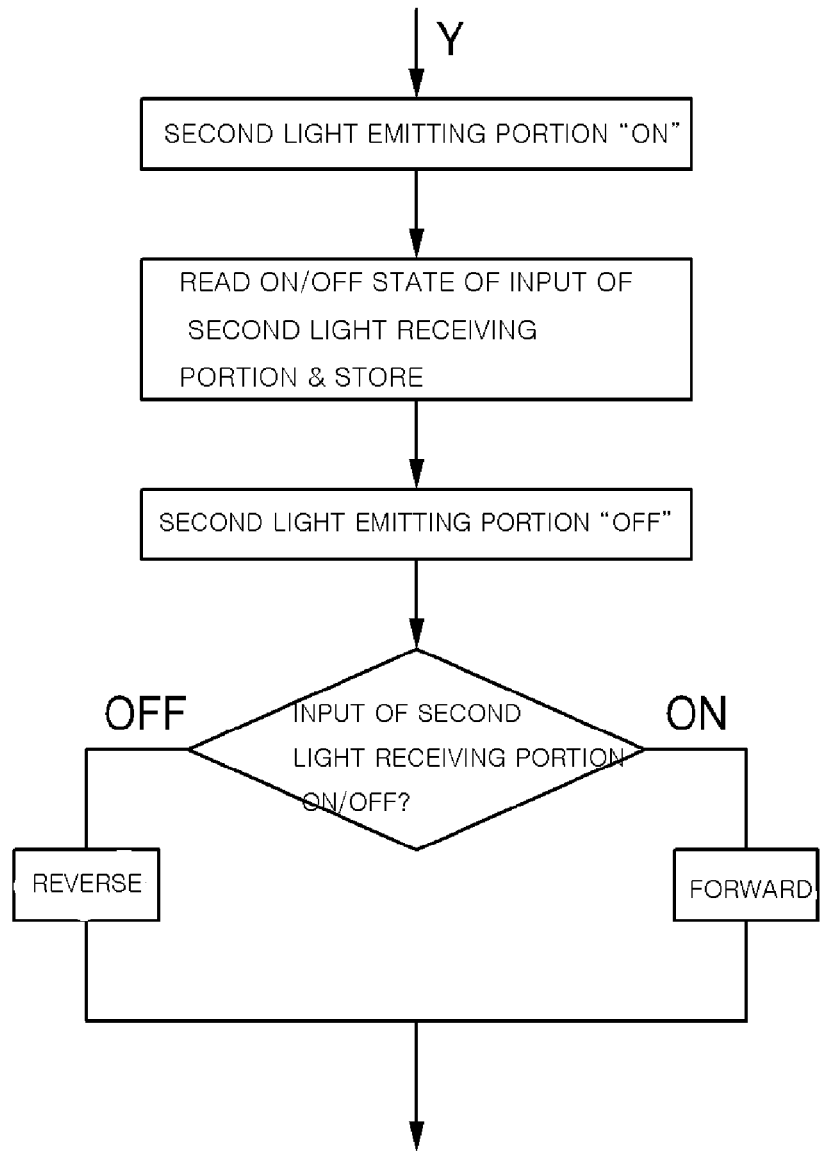
FIG. 18A is a flowchart showing an example of process E in FIG. 17A, which shows an example of a process of determining a fluid flow direction by the flow rate measurement device of FIG. 1.
Figure 18B:
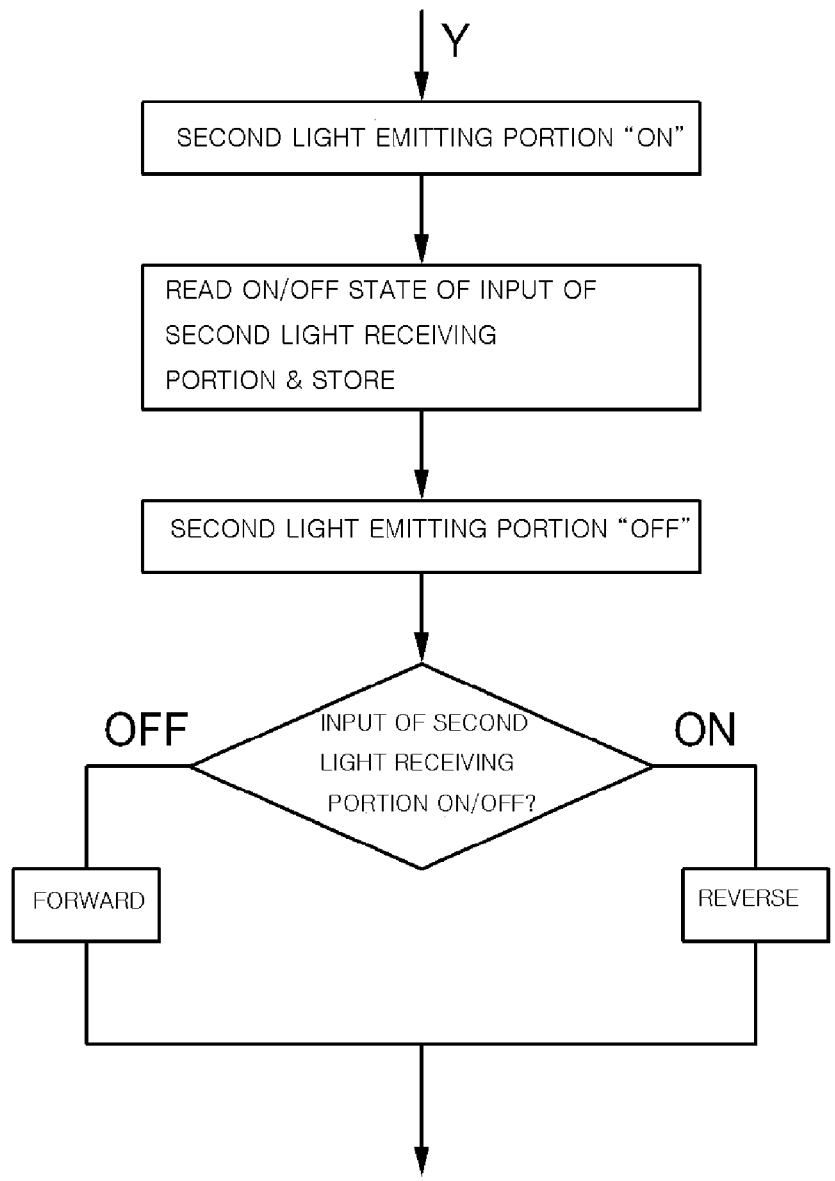
FIG. 18B is a flowchart showing an example of process F in FIG. 17B, which shows an example of a process of determining a fluid flow direction by the flow rate measurement device of FIG. 1.

Meanwhile, when the input of the first light receiving portion 312 is ON, it is checked whether the last previous state of the first light receiving portion 312 was OFF according to A of FIG. 14, and if it was the OFF state, the number of rotations is increased by 0.5, while there is no increase in the number of rotations when the ON state is maintained.

Likewise, when the input of the first light receiving portion 312 is in OFF state, it is checked whether the last previous state of the first light receiving portion 312 was ON according to B of FIG. 14, and if it was the ON state, the number of rotations is increased by 0.5 so that the number of rotations may be counted to correspond to one rotation of the rotating portion 200 when there is one blocking portion.

Further, as another embodiment, when the input of the first light receiving portion 312 is ON, it is checked whether the last previous state of the first light receiving portion 312 was OFF, and when it is the OFF state, the number of rotations may be increased by 1, and when the input of the first light receiving portion 312 is OFF, the number of rotations may not be changed or, conversely, when the input of the first light receiving portion 312 changes from OFF to ON, the number of rotations may be increased by 1, and when the input of the first light receiving portion 312 changes from ON to OFF, the number of rotations may not be changed so that the number of rotations may be counted to correspond to one rotation of the rotating portion 200 when there is one blocking portion.

When there are N (N is a natural number of 1 or more) number of blocking portions 321 formed, the number of state changes of the first light receiving portion 312 may be counted as 1/(2N), thereby enabling accurate determining of the number of rotations, and when there are N (N is a natural number of 1 or more) number of blocking portions 321 formed, it goes without saying that the number of state changes of the first light receiving portion 312 may be counted by the typical process, and the obtained value may be used as it is, or may be converted using a conversion formula and calculated.

Meanwhile, when the conventional flow measurement device is used, the method of counting the number of rotations employs a fixed period by usually setting a fixed period with a short period in preparation for a relatively fast rotation, which results in disadvantages of very frequent light emissions and high energy consumption. In order to remedy for this disadvantages, a flow rate measurement method for adjusting the light emission period based on the rotational speed of the rotating portion will be described below.

In the flow rate measurement method for adjusting the light emission period based on the rotational speed, as shown in FIGS. 14 to 18B, the flow rate may be measured based on a rotational speed of the rotating portion 200, by calculating a hold time during which the result value according to whether the first light receiving portion 312 receives light is maintained the same, comparing the calculated result with a hold time during which a previous result value is maintained the same, and increasing or decreasing the set period (t) according to increase or decrease in the hold time.

For example, when the first light receiving portion 312 has a Hi input value due to the blocking of an optical path, the period of time from time at which the first low input is converted to the Hi input, to the time at which the Hi input is converted to the Low input is calculated, and the hold time of maintaining the Hi input value is calculated.

At this time, the hold time may be calculated by multiplying the set period (t) by a counted number of times of Hi input value stored while the Hi input value is maintained.

Meanwhile, when the input values of the first light receiving portion 312 are output at intervals of the set period (t), the counted number of times of the Hi input value may be obtained by counting the number of times the value is Hi and storing the counted result in the memory 373.

More specifically, when the first light receiving portion 312 is in OFF state, it is determined whether the latest state of the first light receiving portion 312 was ON or OFF, and when the latest state of the first light receiving portion 312 is also OFF, the count value of the OFF state of the first light receiving portion 312 is increased by one.

Subsequently, when the state of the first light receiving portion 312 changes from OFF to ON, the count of the ON state of the first light receiving portion 312 is set to 0, and at the same time, the period of time of the OFF state of the first light receiving portion 312 is calculated by multiplying the counted value for the OFF state of the first light receiving portion 312 by the set period (t).

With reference to the period of time of the OFF state of the first light receiving portion 312 calculated in this way, when the period of time of the OFF state of the first light receiving portion 312 is decreased by a preset offset value or more, this means that the rotational speed of the rotating portion 200 is increased, and in response to this, the set period (t) may be shortened according to the decreased amount.

On the other hand, with reference to the period of time of the OFF state of the first light receiving portion 312 calculated in this way, when the period of time of the OFF state of the first light receiving portion 312 is increased by a preset offset value or more, this means that the rotational speed of the rotating portion 200 is decreased, and in response to this, the set period (t) may be extended according to the increased amount.

With reference to the period of time of the OFF state of the first light receiving portion 312, when the period of time of the OFF state of the first light receiving portion 312 is within a range of preset offset value, there is no change in the set period (t).

In this way, the period of time of the ON state of the first light receiving portion 312 may also be calculated, and it is needless to say that the set period (t) may be adjusted or maintained according to the calculated time.

Meanwhile, in addition to the adjustment and maintenance of the set period (t) as described above, for the efficient flow rate measurement, the maximum and minimum values may be limited to a lower minimum value when there is a minimum value lower than the preset minimum value, and limited to a greater maximum value when there is a maximum value greater than the preset maximum value.

Hereinafter, a method for determining the direction of rotation of the flow rate measurement device according to the present invention will be described in detail with reference to the accompanying drawings.

As shown in FIGS. 17A to 18B, there may be further provided a second sensing portion 350 including a second light emitting portion 351 arranged to have a predetermined angle difference with the first sensing portion 310 around the rotating shaft 210, and generate light in the axial direction of the rotating shaft 210, and a second light receiving portion 352 arranged to be spaced apart from the second light emitting portion 351 in the axial direction of the rotating shaft 210, and receive the light emitted from the second light emitting portion 351, in which the control portion 330 may determine a direction of rotation of the rotating portion 200 according to whether the light to the first light receiving portion 312 and the second light receiving portion 352 is blocked.

In order to determine the direction of rotation of the flow rate measurement device, it is preferable that an odd number of blocking portions 231 are formed for efficient and accurate determination of the direction of rotation.

The direction of rotation of the rotating portion 200 may be recognized according to the relative determination of the blocking/unblocking of the optical path according to the interaction with the interaction portion 320 of the first sensing portion 310 and the second sensing portion 350, and through this, the flow direction of the fluid may be determined.

For example, an example in which the first sensing portion 310 and the second sensing portion 350 form an angle of 90° around the rotating shaft 210, with one blocking portion 321 formed by 180° will be described below.

As shown in FIG. 4, when the flow of the fluid is in the forward direction, the rotating portion 200 rotates clockwise, and when the flow of the fluid is in the reverse direction, the rotating portion 200 rotates counterclockwise.

By determining the blocked/unblocked state of the optical path of the second sensing portion 350 based on the first sensing portion 310 during clockwise rotation of the rotating portion 200, it is seen that the optical path of the second sensing portion 350 is maintained in the blocked state when the optical path of the first sensing portion 310 changes from the unblocked state to the blocked state.

On the other hand, by determining the blocked/unblocked state of the optical path of the second sensing portion 350 based on the first sensing portion 310 during counterclockwise rotation of the rotating portion 200, it is seen that the optical path of the second sensing portion 350 is maintained in the unblocked state when the optical path of the first sensing portion 310 changes from the unblocked state to the blocked state.

That is, when the first light receiving portion 312 changes from the OFF state to the ON state, if the second light receiving portion 352 is maintained in the OFF state, the flow of the fluid is in the forward direction, and if the second light receiving portion 352 is maintained in the ON state. the flow of the fluid is in the reverse direction.

Meanwhile, for the determination of the direction of rotation, even when there are a plurality of, and odd number of blocking portions 321, it is preferable that the first sensing portion 310 and the second sensing portion 350 are arranged to form an angle of 90° with the first sensing portion 310 around the rotating shaft 210 as described above, and it is needless to say that the flow direction of the fluid can be determined as described above.

Meanwhile, a second embodiment of the flow rate measurement device according to the present invention will be described in detail with reference to the accompanying drawings, and a description of the same configurations as those of the embodiment described above will be omitted.

Figure 19:
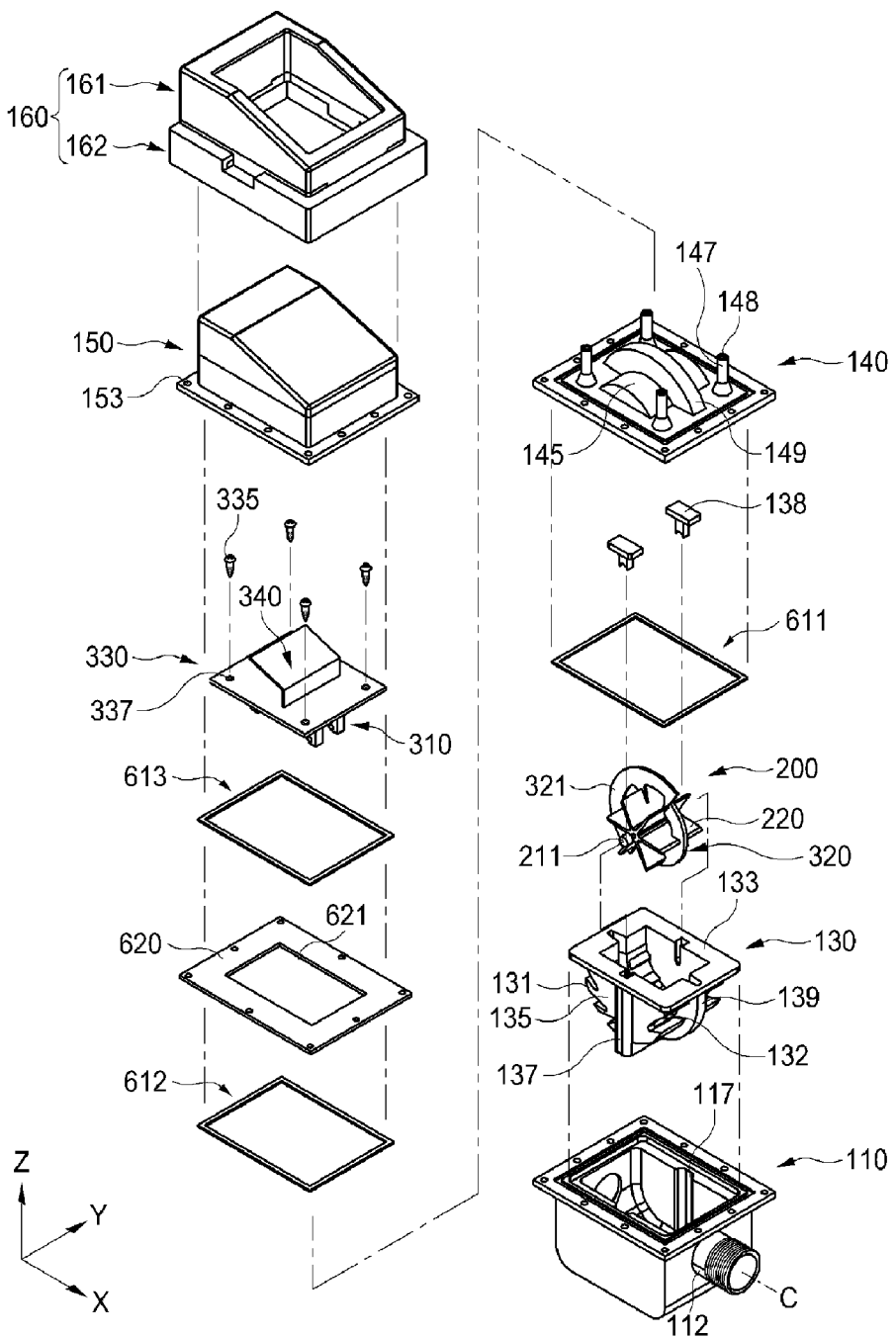
FIG. 19 is an exploded perspective view showing a flow rate measurement device according to a second embodiment of the present invention.

As shown in FIG. 19, the housing 100 may include a blackout cover 160 coupled to the outside of the upper housing 150 to provide a blackout operating environment for the sensor portion measuring the flow rate using an optical sensor.

The blackout cover 160 may have any configuration as long as it is coupled to the outside of the upper housing 150 to provide a blackout environment inside the upper housing 150.

For example, the blackout cover 160 may include a side cover portion 161 that surrounds the flange portion 153 of the upper housing 150 and is coupled and installed thereto, and an upper surface cover portion 162 coupled to an upper side of the side cover portion 161.

At this time, the upper cover portion 162 may include an opening to expose the display portion 340 to the outside, and through this, provide information such as a flow rate to the user.

The blackout cover 160 may be coupled with the upper housing 150 with various methods, and more preferably, may be coupled by bolt fastening or the like.

Meanwhile, the cover member 140 may be coupled with the control portion 330 by various methods, and for example, may be coupled by bolt fastening.

Figure 20:
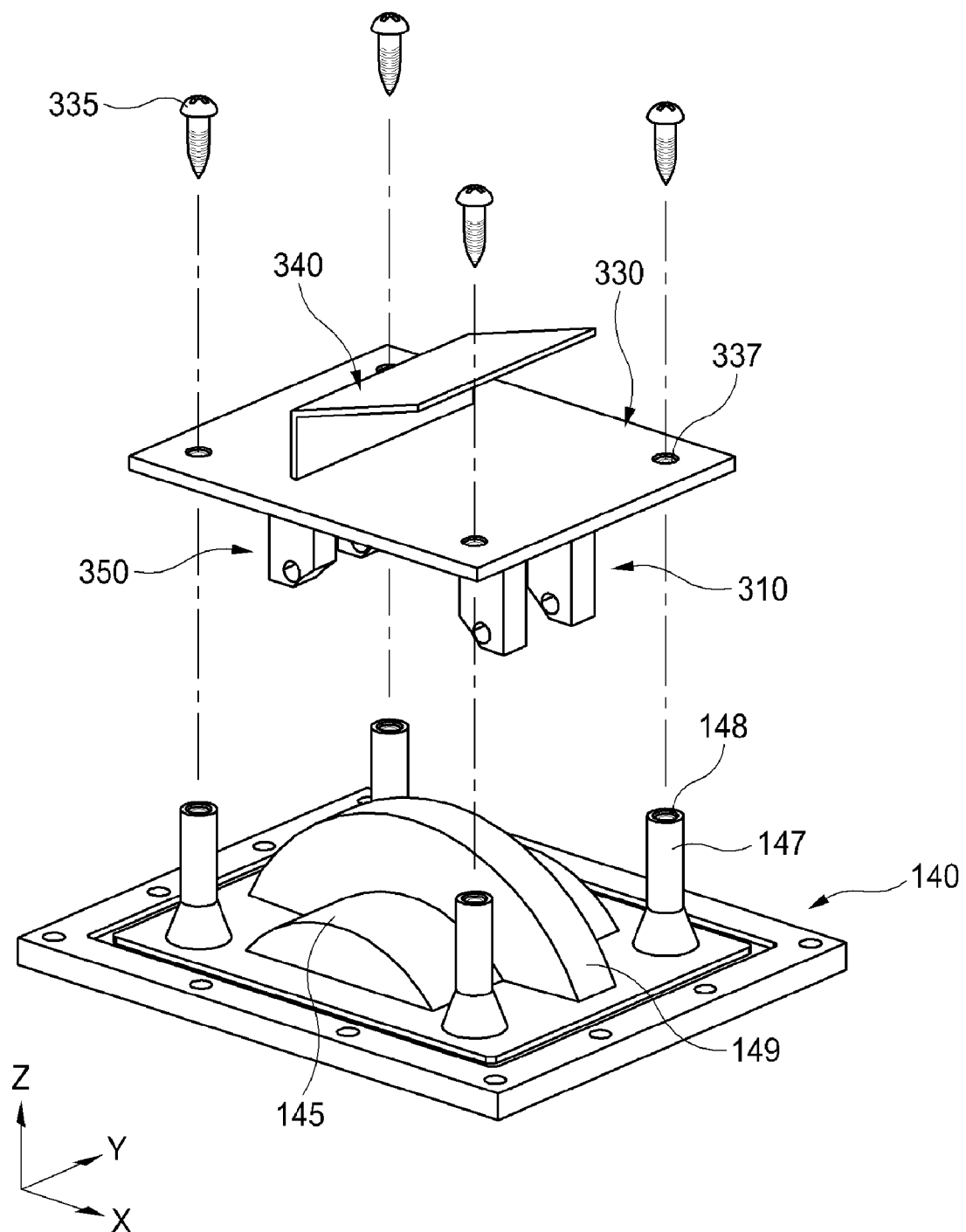
FIG. 20 is an exploded perspective view showing a coupling relationship between the cover member and the control portion of the flow rate measurement device of FIG. 19.

That is, as shown in FIG. 20, the cover member 140 may include a plurality of coupling members 147 formed on an upper surface at locations corresponding to a plurality of through holes 337 formed in the control portion 330, in which the coupling members 147 include corresponding bolt holes 148 to receive a plurality of screws 335 penetrating through the plurality of through holes 337 to be inserted and bolt fastened.

At this time, the plurality of coupling members 147 may have a predetermined height such that the control portion 330 and the cover member 140 may be coupled at a predetermined distance apart from each other, and include bolt holes formed at an end of the control portion 330, to which screws 335 penetrating the through holes 337 formed in the control portion 330 may be bolt-fastened.

Figure 21:
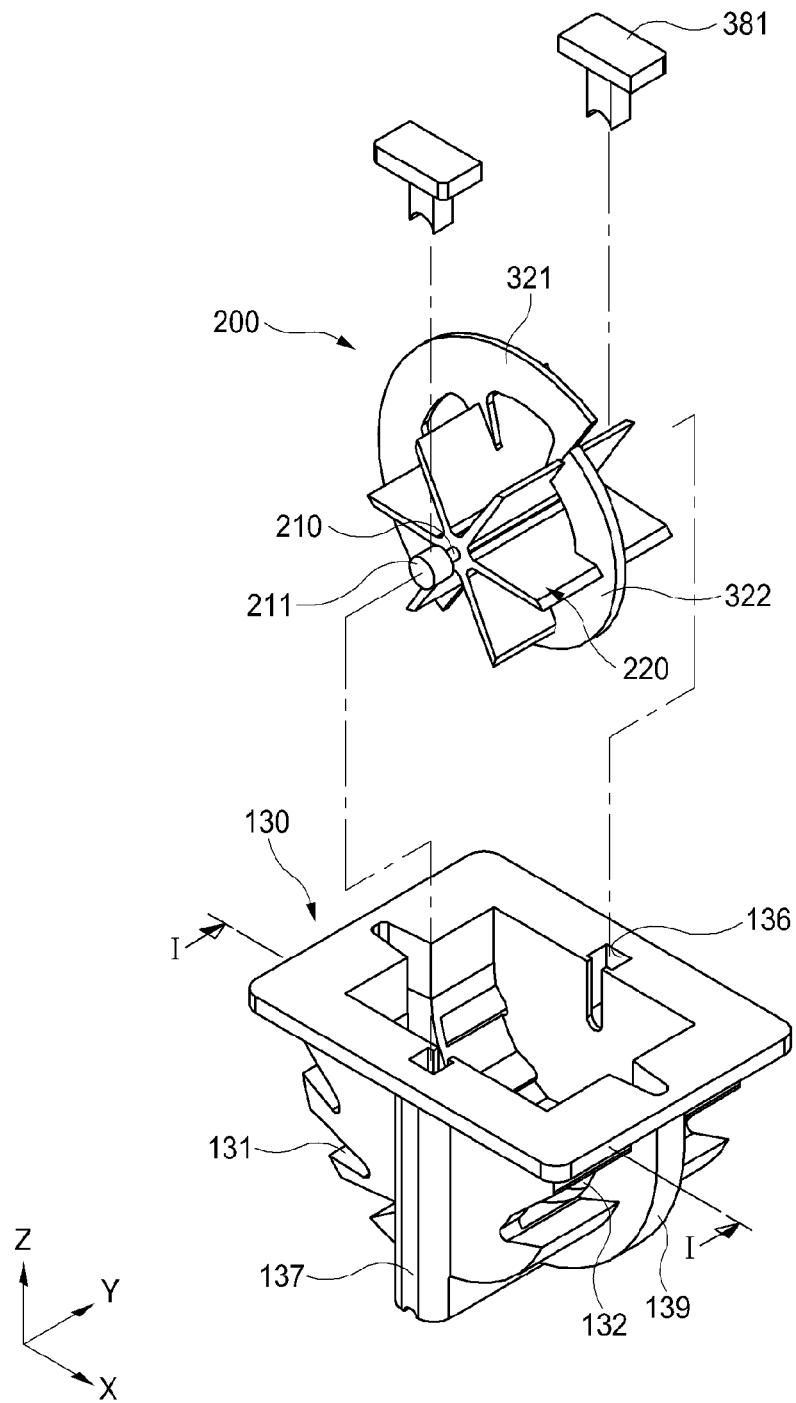
FIG. 21 is an exploded perspective view showing a coupling relationship between the rotating portion and the sub-housing of the flow rate measurement device of FIG. 19.
Figure 22:
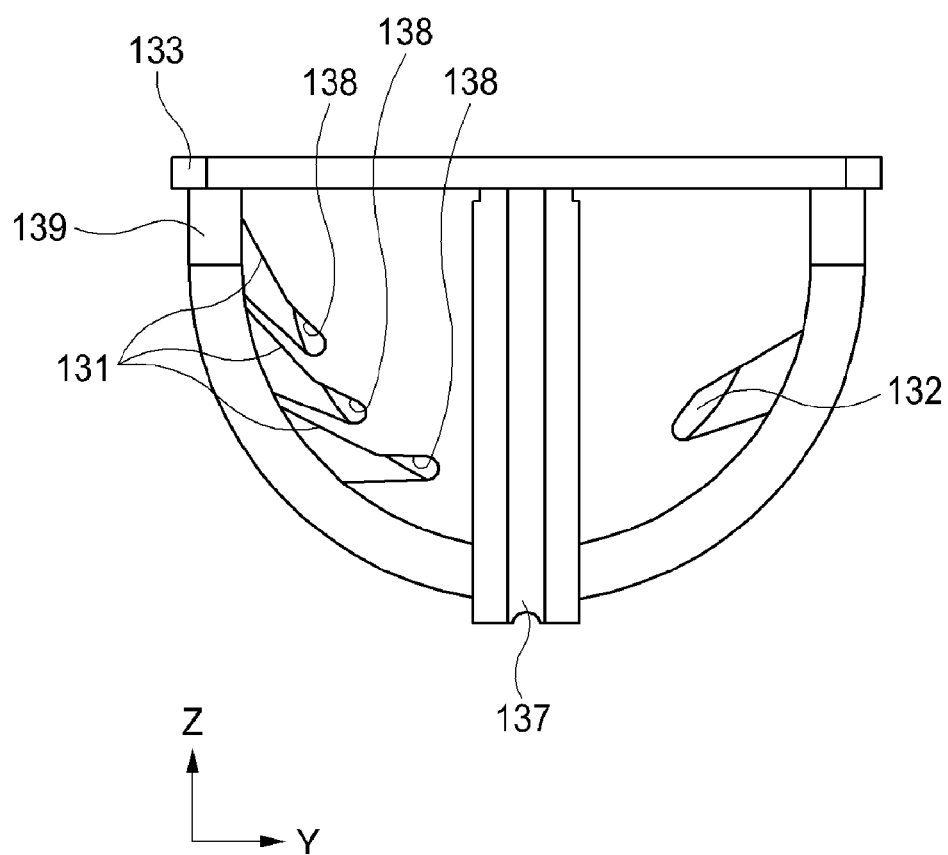
FIG. 22 is a side view showing the sub-housing of the flow rate measurement device of FIG. 21.
Figure 23:
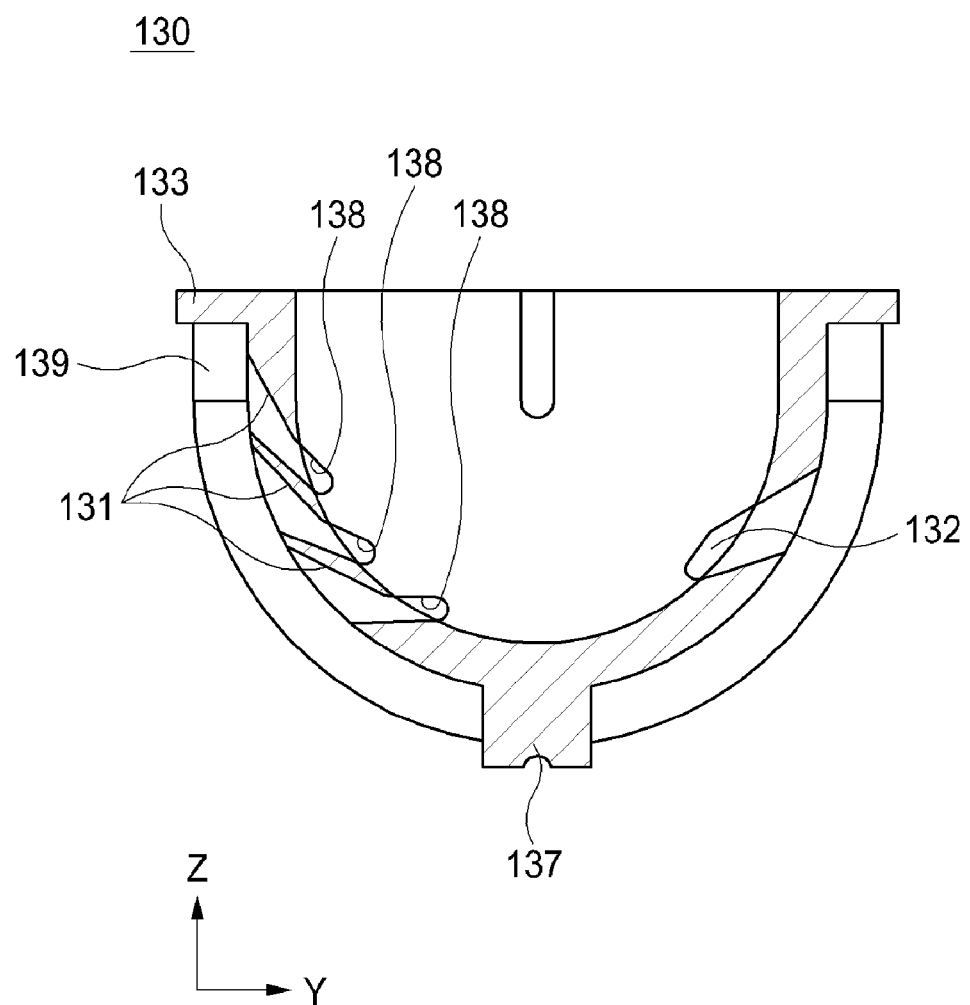
FIG. 23 is a cross-sectional view in the direction I-I, showing the sub-housing of the flow rate measurement device of FIG. 19.
Figure 24:
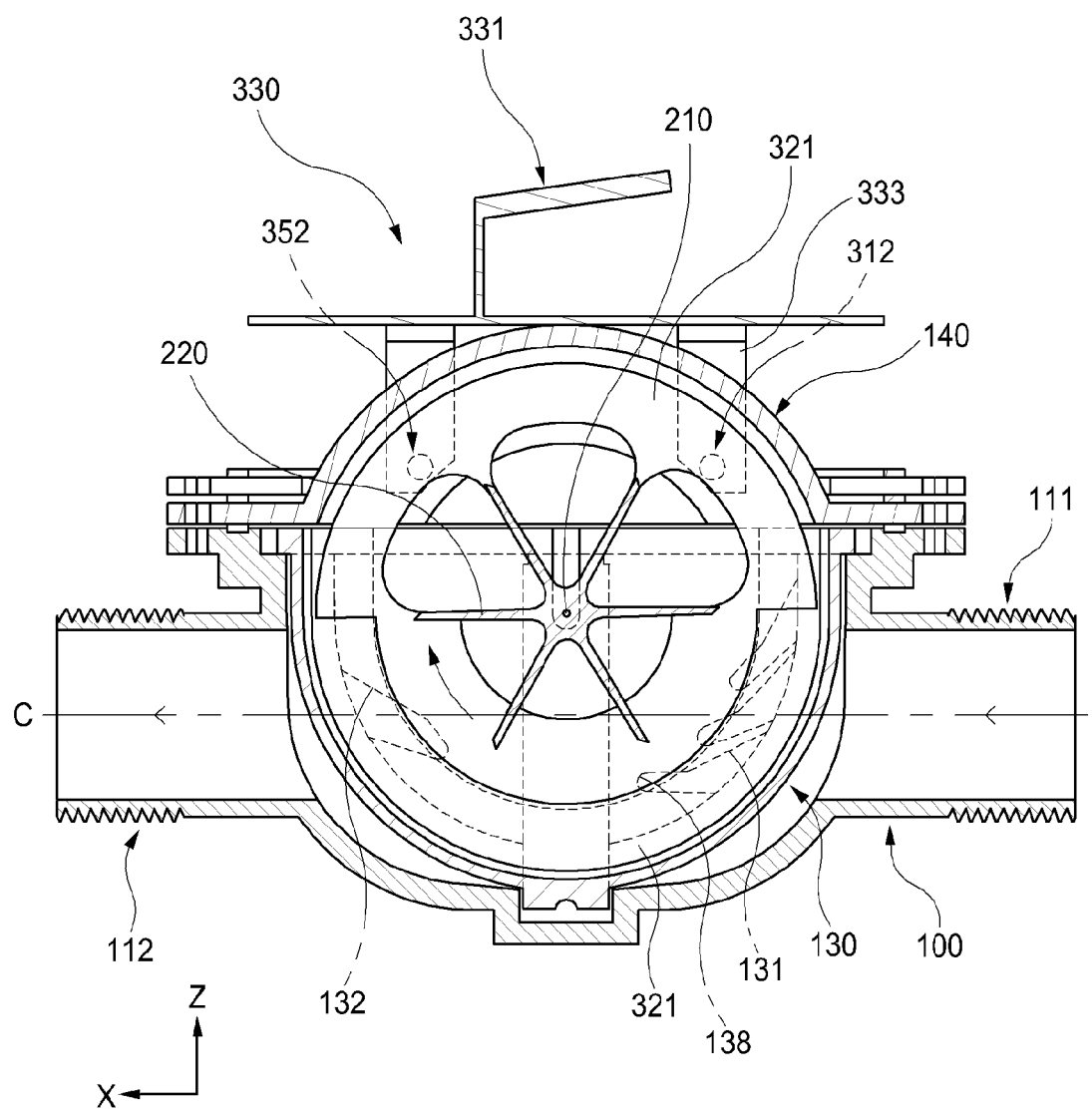
FIG. 24 is a vertical cross-sectional view showing a process of positioning and operating the rotating portion and the sensor portion of the flow rate measurement device of FIG. 19.

In addition, as shown in FIGS. 21 to 23, the sub-housing 130 may include rotation guide portions 139 extending to protrude from the inner circumferential surface of the inner space in the radial direction of the rotating shaft 210, respectively, to ensure that the blocking portion 321 extending in the radial direction of the rotating shaft 210 is rotatable without interference.

At this time, the rotation guide portion 139 may be configured such that it 139 protrudes from the inner circumferential surface at each side on which the inflow port 131 and the outflow port 132 of the sub-housing 130 are formed, and various configurations may be applicable.

For example, the rotation guide portion 139 may protrude from the inner circumferential surface of the inner space of the sub-housing 130 respectively and extend vertically and continuously across a center of each side on which the inflow port 131 and the outflow port 132 of the sub-housing 130 are formed.

That is, the rotation guide portion 139 may be continuously formed without interruption while vertically extending across the center of the side on which the inflow port 131 is formed, and likewise may also be continuously formed without interruption while vertically extending across the center of the side on which the outflow port 132 is formed.

Through this, as shown in FIGS. 22 and 23, as the sub-housing 130 has a relatively simple structure, thus providing advantages of ease of fabrication and low cost for the injection fabrication.

Meanwhile, in this case, the inflow port 131 and the outflow port 132 may be a plurality of openings formed in symmetry with respect to the rotation guide portion 139, respectively.

More specifically, the inflow port 131 may include a total of six openings, including three openings extending from the upper side to the lower side on the left side with respect to the rotation guide portion 139 and three openings formed symmetrically on the right side with respect to the rotation guide portion 139.

At this time, the inflow port 131 may be formed to include a portion of a radial shape when viewed from a side surface perpendicular to the rotating shaft 210 of the sub-housing 130 to guide the fluid so that the blade 220 is rotated from the inflow port 131 side toward the outflow port 132 side at the lower side of the rotating shaft 210.

That is, the inflow port 131 may include an opening having a corresponding shape such that the inflow of the fluid moves to the lower side of the rotating shaft 210.

Meanwhile, as shown in FIG. 22, the inflow port 131 may include a bent portion 138.

The bent portion 138 may be configured to be bent such that the inflow port 131 faces the inlet port 111 so as to allow the fluid to flow smoothly through the inflow port 131 from the inlet port 111 that is located higher than the blade 220 and the lowest height inside the sub-housing 130.

It goes without saying that the bent portion 138 may be formed in the outflow port 132 like the inflow port 131.

Furthermore, rather than the bent portion 138, the inflow port 131 and the outflow port 132 may be formed with a slope in a gentle curved shape on a side.

Like the inflow port 131, the outflow port 132 may also be formed, and the outflow port 132 may include one opening formed on the left side and one opening formed on the right side, respectively, with respect to the rotation guide portion 139.

This is because the outflow port 132 is preferably formed by minimizing the number of openings for ease of fabrication and smooth discharge of fluid, considering difference from the inflow port 131 which is provided for applying the pressure of the fluid through a plurality of openings such that the blade 220 overcomes the inertia and is rotated.

Meanwhile, it goes without saying that other examples are possible, such as, the outflow port 132 may include a plurality of openings.

Furthermore, the outflow port 132 may also be formed to include a portion of a radial shape having a higher height at the outer side when viewed from a side surface perpendicular to the rotating shaft 210 of the sub-housing 130 to guide the fluid so that the blade 220 is rotated from the inflow port 131 side toward the outflow port 132 side at the lower side of the rotating shaft 210.

With this, both the inflow port 131 and the outflow port 132 may have an advantage that fluid is smoothly introduced or discharged from the inlet port 111 and the discharge port 112 positioned higher than the blade 220 and the lowest height inside the sub-housing 130.

In addition, as shown in FIG. 21, the semicircular connecting portion 322 and the blocking portion 321 may have different thicknesses from each other, and more preferably, the mass of the blocking portion 321 having a larger radius may be less than the mass of the semicircular connecting portion 322 having a smaller radius than the blocking portion 321 so that the moment of inertia according to rotation is constant.

That is, regarding the semicircular connecting portion 322 and the blocking portion 321, since the thickness of the blocking portion 321 having a larger radius is formed thinner than the semicircular connecting portion 322 having a relatively smaller radius, the inertia moment of the blocking portion 321 and the semicircular connecting portion 322 may be equal to each other, and the weight deviation of the interaction portion 320 may be eliminated.

More specifically, regarding the semicircular connecting portion 322 and the blocking portion 321, the thickness of the semicircular connecting portion 322 may be 2 mm in order to increase the mass, and the thickness of the blocking portion 321 may be 1 mm so that the mass is smaller than that of the semicircular connecting portion 322.

Thus, by eliminating the weight deviation according to the position of the interaction portion 320, and by making the moment of inertia constant, a smooth rotation at a constant speed, which is stable without rotational vibration, can be achieved.

In addition, as described above, the rotating shaft 210 may be inserted into and coupled to the blade 220, and more preferably, may be fabricated as integral form by insert injection.

It is to be noted that the above is merely a description of some of the preferred embodiments that can be implemented by the present invention, and accordingly, as is well known, the scope of the present invention should not be construed as being limited to the above embodiments, and all technical spirits of the present invention described above and technical spirits that share the basics are included in the scope of the present invention.

What is claimed is:
1. A flow rate measurement device comprising:
a housing including an inlet port and a discharge port for a fluid, which are formed to face each other;
a rotating portion including a rotating shaft arranged perpendicularly to a virtual line connecting the inlet port and the discharge port inside the housing, and a blade rotated by a flow of the fluid around the rotating shaft;
a sensor portion arranged to be spaced apart from the rotating shaft in a radial direction of the rotating shaft so as to sense a number of rotations of the rotating portion; and
a control portion that measures a flow rate of the fluid on the basis of the number of rotations of the rotating portion sensed by the sensor portion,
wherein the sensor portion includes a first sensing portion installed to be spaced apart from the rotating shaft in the radial direction of the rotating shaft, and an interaction portion coupled radially to the blade such that the rotation of the rotating portion is recognized by an interaction with the first sensing portion,
wherein the first sensing portion includes a first light emitting portion that generates light in an axial direction of the rotating shaft, and a first light receiving portion that is spaced apart from the first light emitting portion in the axial direction of the rotating shaft to receive the light emitted from the first light emitting portion,
wherein the interaction portion includes one or more blocking portions arranged at an angle difference of 180°/N, where N is a natural number of 1 or more, to be able to alternately block and unblock an optical path between the first light emitting portion and the first light receiving portion by the rotation of the rotating shaft,
wherein the housing includes:
a lower housing including the inlet port and the discharge port which are formed to face each other, and an opening on an upper side;
an upper housing coupled with the lower housing to cover the opening of the lower housing, and exposing a display portion of the control portion to outside;
a sub-housing installed within the lower housing and supporting the rotating portion, and including a guide flow path formed to guide the fluid introduced through the inlet port toward the discharge port, and an opening on an upper side; and a cover member that covers the opening of the sub-housing and includes a first transparent guide groove protruding upward to guide the rotation of the interaction portion,
wherein the first light emitting portion and the first light receiving portion are installed to face each other with respect to the first transparent guide groove.

2. The flow rate measurement device according to claim 1, wherein the sensor portion further includes a second sensing portion arranged around the rotating shaft to have a predetermined angle difference with the first sensing portion, and including a second light emitting portion that generates light in the axial direction of the rotating shaft and a second light receiving portion arranged to be spaced apart from the second light emitting portion in the axial direction of the rotating shaft to receive the light emitted from the second light emitting portion,
wherein the control portion determines a direction of rotation of the rotating portion according to whether the light to the first light receiving portion and the second light receiving portion is blocked.

3. The flow rate measurement device according to claim 2, wherein the interaction portion includes one or more blocking portions arranged at an angle difference of 180°/P (P is an odd number of 1 or more) to be able to alternately block and unblock an optical path between the first light emitting portion and the first light receiving portion and between the second light emitting portion and the second light receiving portion by the rotation of the rotating shaft.

4. The flow rate measurement device according to claim 1, wherein the blocking portion is an arc-shaped plate having an angle of 180°/N (N is a natural number of 1 or more) around the rotating shaft.

5. The flow rate measurement device according to claim 1, wherein the blocking portion is divided into a plurality of areas around the rotating shaft.

6. The flow rate measurement device according to claim 1, wherein the blocking portion is integrally formed by being connected along a circumferential direction around the rotating shaft.

7. The flow rate measurement device according to claim 1, wherein the blade has a rectangular shape arranged in a longitudinal direction of the rotating shaft and is coupled, at one end, to the rotating shaft, and the blocking portion is formed with the blade by integral injection.

8. The flow rate measurement device according to claim 1, wherein the blocking portion is a circular plate formed by double injection using a transparent material and an opaque material, and coupled to the blade.

9. The flow rate measurement device according to claim 1, wherein the blocking portion is arranged at a center of the blade in a longitudinal direction of the rotating shaft.

10. The flow rate measurement device according to claim 1, wherein the blocking portion is formed as an arc-shaped plate having an angle of 180° around the rotating shaft, and further includes a semicircular connecting portion connecting both ends of the blocking portion to each other along a circumferential direction around the rotating shaft.

11. The flow rate measurement device according to claim 1, wherein the sub-housing includes:
a pair of rotating shaft guide grooves formed on an inner circumferential surface such that the rotating shaft can be inserted from an upper side; and
protruding guide portion formed on an outer circumferential surface, wherein the protruding guide portion correspond to the rotating shaft guide grooves and are inserted along the second guide groove formed on the inner circumferential surface of the lower housing such that the rotating shaft is arranged perpendicularly to the virtual line connecting the inlet port and the discharge port.

12. The flow rate measurement device according to claim 1, wherein the sub-housing includes an inflow port and an outflow port which are formed to face each other around the rotating shaft so as to form a guide flow path for guiding the fluid introduced through the inlet port toward the discharge port.

13. The flow rate measurement device according to claim 12, wherein the sub-housing and the cover member form a cylindrical inner space corresponding to the rotation of the blade, and include rotation guide portions and extending to protrude from an inner circumferential surface of the cylindrical inner space in the radial direction of the rotating shaft to allow a rotation of the blocking portion extending in the radial direction of the rotating shaft.

14. The flow rate measurement device according to claim 13, wherein the rotation guide portion protrudes from the inner circumferential surface of the inner space of the sub-housing respectively and extends vertically and continuously across a center of each side on which the inflow port and the outflow port of the sub-housing are formed.

15. The flow rate measurement device according to claim 14, wherein the inflow port and the outflow port are a plurality of openings formed in symmetry with respect to the rotation guide portion, respectively.

16. The flow rate measurement device according to claim 15, wherein the inflow port and the outflow port are formed in a radial shape on a side perpendicular to the rotating shaft of the sub-housing to guide the fluid such that the blade is rotated from the inflow port side toward the outflow port side at a lower side of the rotating shaft.

17. A flow rate measurement method using the flow rate measurement device according to claim 13, the method comprising:
a light emitting step (S1), at the first light emitting portion, of emitting light toward the first light receiving portion;
a storage step (S2), at the control portion, of determining whether the first light receiving portion receives the light and storing a result value accordingly; and
an off step (S3) of turning off the light emission of the first light emitting portion,
wherein the flow rate is measured by repeating the light emitting step (S1), the storage step (S2) and the off step (S3) at a set period (t) interval, and counting the number of rotations of the rotating portion on the basis of a number of times the result value according to whether the light is received in the storage step (S2) is changed, and
when only the first sensing portion is used, the set period (t) is set to be shorter than a shorter time duration between a time duration during which the blocking portion passes the first sensing portion and a time duration during which the remaining portion other than the blocking portion passes the first sensing portion, and when both the first sensing portion and the second sensing portion are used, the set period (t) is set to be shorter than ½ of the shorter time duration between the time duration during which the blocking portion passes the first sensing portion and the time duration during which the remaining portion other than the blocking portion passes the first sensing portion.

18. The flow rate measurement device according to claim 1, wherein the cover member includes a plurality of coupling members installed on an upper surface, wherein the plurality of coupling members include bolt holes formed therein, through which a plurality of screws, penetrating a plurality of through holes formed in the control portion, are inserted and bolted so as to be coupled at a predetermined distance apart from the control portion.

19. A flow rate measurement method using the flow rate measurement device according to claim 1, the method comprising:
- a light emitting step (S1), at the first light emitting portion, of emitting light toward the first light receiving portion;
- a storage step (S2), at the control portion 330, of determining whether the first light receiving portion receives the light and storing a result value accordingly; and
- an off step (S3) of turning off the light emission of the first light emitting portion,
- wherein the flow rate is measured by repeating the light emitting step (S1), the storage step (S2) and the off step (S3) at a set period (t) interval, and counting the number of rotations of the rotating portion on the basis of a number of times the result value according to whether the light is received in the storage step (S2) is changed.

20. The flow rate measurement method according to claim 19, wherein the flow rate is measured based on a rotational speed of the rotating portion, by calculating a hold time during which the result value according to whether the first light receiving portion receives light is maintained the same, comparing the calculated result with a hold time during which a previous result value is maintained the same, and increasing or decreasing the set period (t) according to increase or decrease in the hold time.

* * * * *